(12) United States Patent
Fitzpatrick et al.

(10) Patent No.: US 11,570,180 B1
(45) Date of Patent: Jan. 31, 2023

(54) SYSTEMS CONFIGURED FOR VALIDATION WITH A DYNAMIC CRYPTOGRAPHIC CODE AND METHODS THEREOF

(71) Applicant: EQUE CORPORATION, Boca Raton, FL (US)

(72) Inventors: Robert Fitzpatrick, Hertfordshire (GB); Boran Car, London (GB)

(73) Assignee: EQUE CORPORATION, Boca Raton, FL (US)

( * ) Notice: Subject to any disclaimer, the term of this patent is extended or adjusted under 35 U.S.C. 154(b) by 0 days.

(21) Appl. No.: 17/561,024

(22) Filed: Dec. 23, 2021

(51) Int. Cl.
*H04L 9/40* (2022.01)
*H04L 9/32* (2006.01)
*G06Q 20/40* (2012.01)
*H04L 9/06* (2006.01)

(52) U.S. Cl.
CPC ....... *H04L 63/102* (2013.01); *G06Q 20/4018* (2013.01); *H04L 9/0643* (2013.01); *H04L 9/3242* (2013.01); *H04L 63/08* (2013.01); *H04L 63/205* (2013.01); *G06Q 2220/00* (2013.01)

(58) Field of Classification Search
CPC .......... H04L 63/102; H04L 9/0643; H04L 9/3242; H04L 63/08; H04L 63/205; G06Q 20/4018; G06Q 2220/00
See application file for complete search history.

(56) References Cited

U.S. PATENT DOCUMENTS

| | | | | |
|---|---|---|---|---|
| 7,162,035 B1 * | 1/2007 | Durst | ............... | H04L 9/3247 380/54 |
| 7,913,300 B1 * | 3/2011 | Flank | ............... | G06F 9/468 709/224 |
| 8,059,821 B1 * | 11/2011 | Begen | ............... | H04L 9/3242 714/4.11 |
| 8,104,076 B1 * | 1/2012 | Lam | ............... | G06F 21/6218 726/8 |
| 8,875,263 B1 * | 10/2014 | van Dijk | ............... | H04L 63/083 709/225 |
| 10,033,732 B1 * | 7/2018 | Jiang | ............... | H04L 63/0838 |

(Continued)

OTHER PUBLICATIONS

Title: Thales Gemalto Dynamic Code Verification By: Thales Group Date: Mar. 31, 2022.

(Continued)

*Primary Examiner* — Aravind K Moorthy
(74) *Attorney, Agent, or Firm* — Greenberg Traurig, LLP; Chinh H. Pham; Kristopher D. Reichlen

(57) ABSTRACT

Systems and methods of the present disclosure enable operation authorization using a dynamic code. Embodiments includes a computing system for receiving, from an access control server, an operation authorization request to authorize an operation by an initiator, where the operation authorization request includes a user identifier associated with the operation authorization request, and a dynamic code. The computing system accesses a dynamic key embedded in a user credential associated with the user identifier and generates a recalculated dynamic code using a cryptographic algorithm and the dynamic key. The computing system authenticates the operation authorization request based on the dynamic code being equivalent to the recalculated dynamic code and returns the authentication to the access control server to authorize the operation.

20 Claims, 12 Drawing Sheets

(56) References Cited

U.S. PATENT DOCUMENTS

| | | | | |
|---|---|---|---|---|
| 10,181,953 B1* | 1/2019 | Seidenberg | | H04L 9/0861 |
| 10,382,268 B1* | 8/2019 | Meyer | | G06F 21/57 |
| 10,657,754 B1* | 5/2020 | Osborn | | G06K 19/0723 |
| 10,735,398 B1* | 8/2020 | Covati | | H04L 63/0838 |
| 11,093,437 B1* | 8/2021 | Pfiester | | H04W 48/16 |
| 11,257,085 B1* | 2/2022 | Barkas | | G06Q 20/401 |
| 11,470,473 B2* | 10/2022 | Lee | | H04W 12/041 |
| 2004/0083393 A1* | 4/2004 | Jordan | | H04W 12/041 380/270 |
| 2004/0168059 A1* | 8/2004 | Patrick | | H04L 63/08 713/168 |
| 2004/0168060 A1* | 8/2004 | Patrick | | H04L 63/08 713/168 |
| 2005/0132203 A1* | 6/2005 | Dharmarajan | | G06F 21/46 726/19 |
| 2005/0203582 A1* | 9/2005 | Healy | | H04L 9/3242 607/31 |
| 2008/0163383 A1* | 7/2008 | Kumar | | G06F 21/575 726/29 |
| 2008/0170686 A1* | 7/2008 | Nemoto | | H04L 63/0428 380/42 |
| 2008/0197971 A1* | 8/2008 | Elarar | | H04L 9/0891 340/5.81 |
| 2008/0256616 A1* | 10/2008 | Guarraci | | H04L 63/08 726/5 |
| 2008/0263629 A1* | 10/2008 | Anderson | | H04L 9/3271 726/2 |
| 2009/0147958 A1* | 6/2009 | Calcaterra | | H04L 9/0833 380/260 |
| 2009/0279696 A1* | 11/2009 | Ciet | | H04L 9/3242 380/29 |
| 2010/0082966 A1* | 4/2010 | Lu | | G06F 21/575 713/2 |
| 2010/0161975 A1* | 6/2010 | Ducharme | | G06F 21/51 726/2 |
| 2011/0131108 A1* | 6/2011 | Doxey | | G06Q 30/02 705/26.1 |
| 2011/0173435 A1* | 7/2011 | Liu | | H04L 9/3226 713/150 |
| 2011/0213711 A1* | 9/2011 | Skinner | | G06Q 20/3829 455/410 |
| 2012/0047097 A1* | 2/2012 | Sengupta | | G06F 21/60 715/255 |
| 2012/0163565 A1* | 6/2012 | Li | | G06F 16/958 379/88.08 |
| 2012/0210115 A1* | 8/2012 | Park | | H04L 9/3247 713/2 |
| 2013/0145169 A1* | 6/2013 | Poovendran | | H04L 9/0643 713/181 |
| 2014/0013104 A1* | 1/2014 | Vinnik | | H04L 63/123 713/150 |
| 2014/0068244 A1* | 3/2014 | Oliver | | H04L 9/00 713/150 |
| 2014/0173705 A1* | 6/2014 | Manning | | H04L 63/08 726/6 |
| 2014/0237553 A1* | 8/2014 | Feuer | | H04L 63/10 726/4 |
| 2014/0380055 A1* | 12/2014 | Blanchard | | H04L 9/3247 713/171 |
| 2015/0058191 A1* | 2/2015 | Khan | | G06Q 20/4016 705/35 |
| 2015/0161587 A1* | 6/2015 | Khan | | G06Q 20/3223 705/44 |
| 2015/0227931 A1* | 8/2015 | Genovez | | G06F 21/32 705/72 |
| 2015/0286823 A1* | 10/2015 | Elnekaveh | | H04L 9/3242 713/2 |
| 2016/0087950 A1* | 3/2016 | Barbir | | H04L 63/062 713/171 |
| 2016/0173505 A1* | 6/2016 | Ichihara | | H04W 12/121 713/170 |
| 2016/0191470 A1* | 6/2016 | Movalia | | H04L 9/0825 713/171 |
| 2016/0307194 A1* | 10/2016 | Bhatnagar | | H04L 63/0838 |
| 2017/0012956 A1* | 1/2017 | Lee | | H04L 63/0428 |
| 2017/0012969 A1* | 1/2017 | Li | | H04W 12/06 |
| 2017/0061396 A1* | 3/2017 | Melika | | G06Q 20/382 |
| 2017/0063103 A1* | 3/2017 | Do | | H02J 50/12 |
| 2017/0155634 A1* | 6/2017 | Camenisch | | H04L 9/085 |
| 2018/0047014 A1* | 2/2018 | Maus | | H04L 63/0853 |
| 2018/0204260 A1* | 7/2018 | McGregor | | G06Q 30/0609 |
| 2018/0295516 A1* | 10/2018 | Chen | | H04L 9/0861 |
| 2019/0173674 A1* | 6/2019 | Agarwal | | H04L 9/0891 |
| 2019/0303561 A1* | 10/2019 | Humble | | H04L 9/0877 |
| 2020/0084281 A1* | 3/2020 | Ley | | H04W 12/068 |
| 2020/0098072 A1* | 3/2020 | Escobar | | G06Q 10/06 |
| 2020/0204347 A1* | 6/2020 | Mouffron | | H04L 9/0637 |
| 2020/0236537 A1* | 7/2020 | Lee | | H04W 12/0471 |
| 2020/0242588 A1* | 7/2020 | Rule | | G06Q 20/363 |
| 2020/0374120 A1* | 11/2020 | Stanley | | H04L 9/3213 |
| 2021/0233085 A1* | 7/2021 | Pye | | G06Q 20/34 |
| 2021/0377237 A1* | 12/2021 | Sloane | | H04L 63/123 |
| 2021/0377238 A1* | 12/2021 | Sloane | | H04W 12/0471 |
| 2021/0407234 A1* | 12/2021 | Li | | G07C 9/00817 |
| 2022/0052957 A1* | 2/2022 | Sloane | | H04L 9/085 |
| 2022/0139137 A1* | 5/2022 | Johnson | | G07C 9/00857 340/5.25 |

OTHER PUBLICATIONS

Title: Thales Gemalto Dynamic Code Verification (DCV) Card By: Thales Group Date: Mar. 31, 2022.

\* cited by examiner

SYSTEMS CONFIGURED FOR VALIDATION WITH A DYNAMIC CRYPTOGRAPHIC CODE AND METHODS THEREOF

FIELD OF TECHNOLOGY

The present disclosure generally relates to validation of electronic operations using a dynamic cryptographic code.

BACKGROUND OF TECHNOLOGY

The challenges of identity security and fraud prevention are complex and relentless. As technology evolves and new solutions arise, fraudsters quickly adapt and implement new attacks and tactics. Preventing fraud in online and electronic environments has been an area of endeavor resulting in various technologies, including passwords, two-factor authentication, biometric authentication, user behavior analysis and among others. Such technologies have not overcome problems with phishing, session hijacking, man-in-the middle attacks, database breaches, among other attacks. In particular, online transactions have proven particularly hard to protect, with the use of card verification value (CVV) having many of the same problems as passwords.

SUMMARY OF DESCRIBED SUBJECT MATTER

Embodiments of the present disclosure include at least one method for operation authorization using one or more dynamic codes. The method includes: receiving, by at least one processor from an access control server, an operation authorization request to authorize an operation by at least one initiator; wherein the operation authorization request comprises: a user identifier that identifies a user associated with the operation authorization request, and at least one dynamic code; accessing, by the at least one processor, at least one dynamic key embedded in a user credential associated with the user identifier; generating, by the at least one processor, at least one recalculated dynamic code using at least one cryptographic algorithm based at least in part on the at least one dynamic key; authenticating, by the at least one processor, the operation authorization request based at least in part on the at least one dynamic code being the at least one recalculated dynamic code; and instructing, by the at least one processor, the access control server to authorize the operation associated with the operation authorization request.

Embodiments of the present disclosure include at least one system for operation authorization using one or more dynamic codes. The system includes at least one processor configured to execute software instruction in a non-transitory computer readable medium. Upon execution of the software instructions, the at least one processor is configured to perform steps to: receive, from an access control server, an operation authorization request to authorize an operation by at least one initiator; wherein the operation authorization request comprises: a user identifier that identifies a user associated with the operation authorization request, and at least one dynamic code; access at least one dynamic key embedded in a user credential associated with the user identifier; generate at least one recalculated dynamic code using at least one cryptographic algorithm based at least in part on the at least one dynamic key; authenticate the operation authorization request based at least in part on the at least one dynamic code being the at least one recalculated dynamic code; and instruct the access control server to authorize an operation associated with the operation authorization request.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
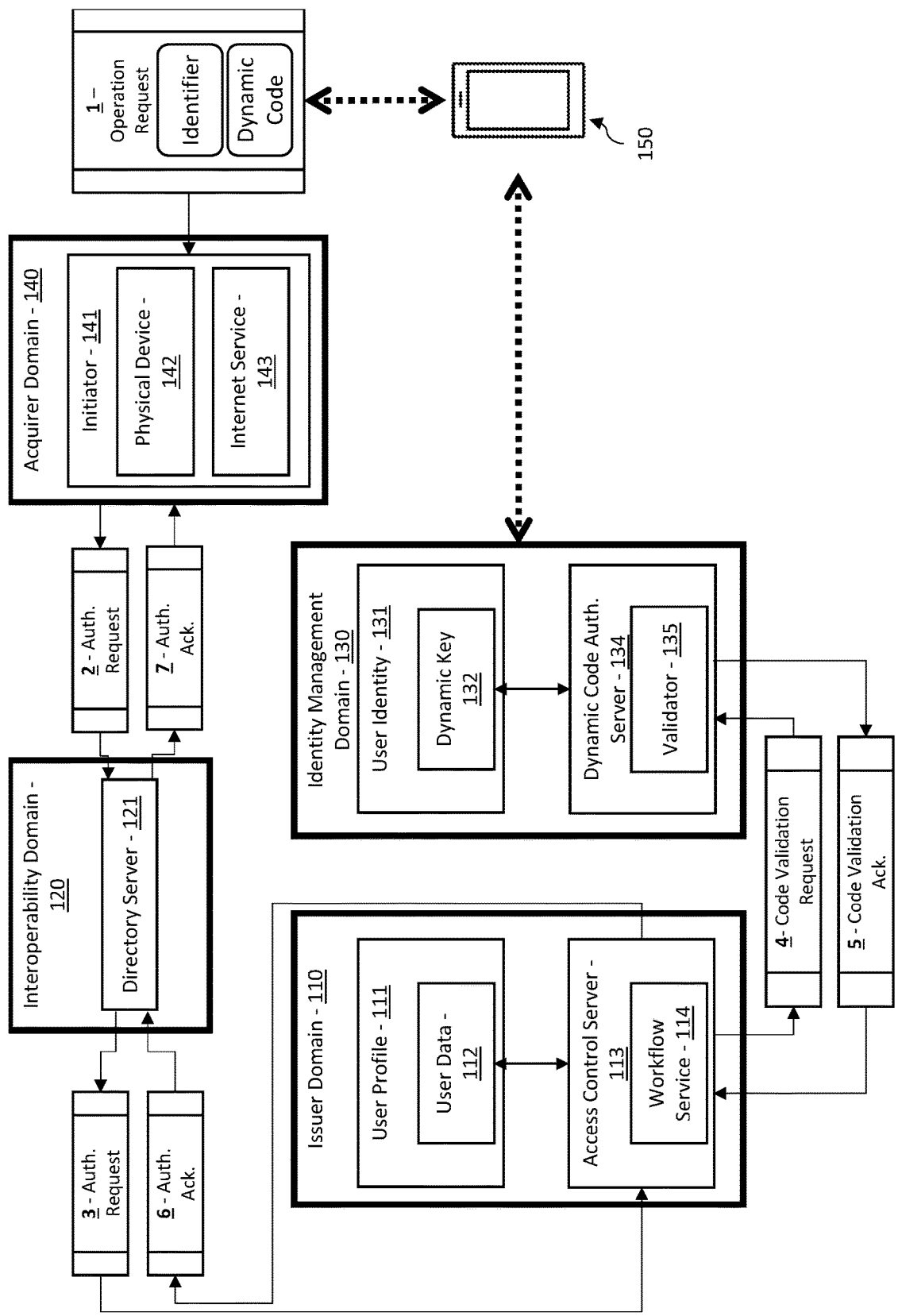
FIG. 1 illustrates an identity management domain that incorporates a dynamic code validation protocol into an electronic operation authorization scheme for more secure operation authorization and execution in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 11 illustrate systems and methods of electronic operation authentication and verification. The following embodiments provide technical solutions and technical improvements that overcome technical problems, drawbacks and/or deficiencies in the technical fields involving identity security and fraud prevention, including deficiencies in the technologies for ensuring identity security and fraud prevention including passwords, two-factor authentication, biometric authentication, user behavior analysis and among others. Such technologies have not overcome problems with phishing, session hijacking, man-in-the middle attacks, database breaches, among other attacks. In particular, online transactions have proven particularly hard to protect, with the use of card verification value (CVV) having many of the same problems as passwords.

As explained in more detail, below, technical solutions and technical improvements herein include aspects of improved temporary, user-specific dynamic codes that vary through time and integrate with existing authentication protocols via use as an additional authorization check. The generation of such dynamic codes is computation efficient and the temporary and cryptographic nature prevents attacks such as phishing, man-in-the-middle and database breaches, while the implementation as a user credential paired with an identity management system enables easy and efficient synchronizing and user-friendly, reliable, and efficient provision to operation initiators to authenticate the operation. While existing solutions rely on static validation codes (e.g., passwords, static CVV codes, etc.) by substituting the static code with a time-based, dynamic code, generated, and stored in a secure mobile wallet application, a malicious party would need access to the secure mobile wallet application, with access control enforced by strong cryptography and biometric authentication. To verify the code, a management domain of the secure mobile wallet may integrate with an access control server or integrate directly with the authorization flow via a simple API, thus minimizing friction and integration cost while providing secure, fraud-resistant authentication and effectively eliminating the technical problems listed above.

Based on such technical features, further technical benefits become available to users and operators of these systems and methods. Moreover, various practical applications of the disclosed technology are also described, which provide further practical benefits to users and operators that are also new and useful improvements in the art.

In the context of online transactions, such solutions may enable strong cardholder authentication, low cardholder friction by minimizing the number of interactions needed, minimal merchant integration cost and complexity and backwards compatibility via software service-based validation of the dynamic code, high cardholder privacy, among other improvements.

FIG. 1 illustrates an identity management domain that incorporates a dynamic code validation protocol into an electronic operation authorization scheme for more secure operation authorization and execution in accordance with one or more embodiments of the present disclosure.

In some embodiments, a user may participate in electronic operations, e.g., over a network such as the internet with increased security by using a dynamic code. Typically, such operations are validated based on a password or static code. For example, for electronic transactions, such as those performed with a credit card or credit account, authorization for the transaction includes a static card verification value (CVV). However, static CVVs are subject to comprise because they are easy to obtain by anyone in the presence of the credit card or that has visibility into the billing process.

Accordingly, a user may initiate and validate electronic operations using a series of computation domains and request messages. For example, operations may be initiated at an acquirer domain 140 that acquired the operation attributes and generates an authorization request message, which is received and forwarded by an interoperability domain 120 to an access control server 113 of an issuer domain 110. The access control server 114 may interoperate with a dynamic code authentication server 134 of an identity management domain 130 to validate a dynamic code associated with the operation, and thus authenticate the user and the operation.

In some embodiments, the terms "computational domain" and "domain" identify at least one ecosystem or platform of computer functionality for performing a set of services, tasks and/or operations. In some embodiments, a domain may include at least one software component and/or a combination of at least one software component and at least one hardware component which are designed/programmed/configured to manage/control other software and/or hardware components (such as the libraries, software development kits (SDKs), objects, etc.). A domain may include any combination of personal computing devices, servers, cloud platforms, and other computing devices/systems that are centralized or decentralized, homogenous or heterogenous, or any combination thereof.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative, and not restrictive.

Accordingly, in some embodiments, the user may use a user device 150 to generate and provide a dynamic code in an operation request at step 1. In some embodiments, the operation request may include attributes of the requested electronic operation, such as, e.g., an identifier identifying the user and/or user profile associated with the operation, an operation identifier identifying the operation, a time, a date, an operation type, the dynamic code, among other attributes. In some embodiments, the user device 150, while illustrated in the figures as a smartphone, may be any suitable computing device, including, e.g., a laptop computer, desktop computer, thin-client, augmented reality or virtual reality device, mobile computer device (such as, e.g., smartphone, tablet, personal digital assistant (PDA), mobile telephone, smartwatch or other wearable or any suitable mobile computing device) or any combination thereof.

For example, in some embodiments, the electronic operation may include a transaction-related activity. In such an example, the data items may include, e.g., a transaction value, a transaction type, a personal account number (PAN), the dynamic code, a static CVV code, an account identifier, or a user identifier or both, a merchant identifier, a transaction authorization date, a transaction post date, a transaction location, an execution device (e.g., point-of-sale device, Internet payment, etc.) among other transaction data and combinations thereof. Other examples may include, e.g., electronic operations include permissioned cloud service access (e.g., media streaming, permissioned files, and data, etc.), social media messaging, social media account access, online account login and/or access, among other electronic activities.

In some embodiments, the user device 150 may use a dynamic key of a user identity to generate the dynamic code based on the dynamic key. In some embodiments, the user device 150 may communicate with an identity management domain 130 to synchronize a dynamic key 132 between the user device 150 and the identity management domain 130. The dynamic key 132 may be a credential of a user identity 131 associated with the user of the user device 150. Thus, the dynamic key 132 may include a user-specific identifier. Accordingly, the user device 150 may use a cryptographic algorithm and a random or pseudorandom number to generate a temporary dynamic code specific to the operation and the user. In some embodiments, the random or pseudorandom number may include any suitable variable input that varies based on the operation request. For example, the random or pseudorandom number may include a time-based value, an operation identifier-based value, a counter-based value, or any other suitable value that varies with the operation. Thus, using the cryptographic algorithm, the user-specific dynamic key 132 and the temporary variable input result in a deterministically generated user and operation specific dynamic code that can be recreated for validation.

In some embodiments, an initiator 141 in an acquirer domain 140 may initiate an electronic operation based on the operation request. In some embodiments, the initiator 141 may include a computing device and/or system including, e.g., a physical device 142, an internet service 143, e.g., provided by a cloud service or other server or server system, a terminal, personal computer or mobile computing device for performing Internet-based and application-based activities (e.g., account logins, account information changes, online purchases, instant message communications, social media posts, person-to-person (P2P), among others and combinations thereof).

In some embodiments, the physical device 142 may include a physical terminal for performing electronic transactions, such as, e.g., a point-of-sale device, automated teller machine (ATM) or other device. As a result of a user executing electronic activities via the electronic activity execution device, data entries may be produced for entry into the user's account. For example, the electronic activity execution device may produce an electronic activity data entry.

In some embodiments, the electronic operation may require authorization to execute relative to a user profile. Thus, the initiator 141 may produce an authorization request at step 2 to request authorization of the electronic operation from an issuer domain 110 that issues the user profile 111. In some embodiments, the operation authorization request may include, e.g., the dynamic code, a user identifier associated with each data entry, a third-party entity identifier associated with each data entry, an activity type identifier, an activity value or activity quantity, a time data item, a location data item, a date data item, a device type or device identifier associated with the electronic activity execution device 101, an activity description, or other attributes representing characteristics of each data entry.

In some embodiments, the initiator 141 sends the authorization request to an interoperability domain 120, e.g., via a suitable API or other suitable interfacing technology. In some embodiments, the interoperability domain 120 may include a directory server 121 to identify the access control server 113 associated with the authorization request. In some embodiments, the directory server 121 is a server which maps the names of network resources to their respective network addresses. Thus, based on the attributes of the authorization request, the directory server 121 may identify an address of the associated issuer domain 110 that issues the user profile 111 of the authorization request. Accordingly, the directory server 121 may forward the authorization request at step 3 to an access control server 113 of the issuer domain 110.

In some embodiments, the access control server 113 identifies a user profile 111 associated with the authorization request based on the identifier. Using user data 112 of the user profile 111, the access control server 113 may perform validation and authorization processes. In some embodiments, the access control server 113 may typically use data such as a password, multi-factor authentication, historical user behaviors, among other data. However, such techniques are often insecure and/or inefficient. For example, passwords and static codes such as personal identification number (PINs) and static CVVs are persistent, static, and often weak (e.g., easily ascertained by non-permissioned users). Thus, such static authentication data are subject to compromise over time. By including a dynamic code in the authorization request to authorize an electronic operation, the user may provide a temporary and cryptographically strong code for authorizing electronic operations. Accordingly, in some embodiments, the access control server 113 may be configured to enable a user to enroll the user profile 111 with the dynamic code validation protocol to authorize operations based on a validation of the dynamic code. In requesting to enroll, the issuer domain 110 may provide the user data 112, including, e.g., the identifier of the user (e.g., a name, phone number, government ID number, personal account number, PIN, or other identifier) to the identity management domain 130.

In some embodiments, in response to the enrollment request, the identity management domain 130 may generate a token which allows the user to enroll in the identity management domain 130 protocol and to receive the user identity 131 including, e.g., the dynamic key 132. In some embodiments, the token may be represented in a number of forms, including, e.g., hyperlink, QR code, biometric identification, username and password combination, or others or any combination thereof, which may be redeemed by inputting the token into a software application associated with the identity management domain 130. In some embodiments, the software application may be installed on the user device 150 or accessed over the Internet as a web application, or any other suitable software application or any combination thereof. In some embodiments, the token may trigger the identity management domain 130 to enable the issuer domain 110 to enroll the user profile 111, e.g., programmatically by linking the user profile 111 to a user identity 131. In some embodiments, the access control server 113 may be configured or otherwise programmed to utilize an application programming interface (API) of the identity management domain 130 or other communication technology to enable the issuer domain 110 to enroll the user profile 111. In some embodiments, the access control server 113 may be further configured to mark the user profile 111, e.g., using a flag or metadata in user data 112, to indicate enrollment with the identity management domain 130 for the dynamic code validation protocol. In some embodiments, the mark may be associated with the user profile 111 but not be in the user data 112.

In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely customized, specific to a component, or designed based on an industry-standard to ensure interoperability to enable modular programming through information hiding, allowing users to use the interface independently of the implementation.

In some embodiments, the linking includes a routing in the access control server 113 that routes authorization requests to the dynamic code authentication server 134 for operations associated with the user profile 111.

In some embodiments, the access control server 113 accesses the user data 112 in the user profile 111. A workflow service 114 may then determine whether the user profile 111 is enrolled for dynamic code authentication based on security preferences stored in the user data 112. For example, the access control server 113 may access the mark indicating enrollment via, e.g., a look-up-table, database query, API call, or any other suitable mechanism or any combination thereof.

In some embodiments, where the user is enrolled, the workflow service 114 implements an authentication workflow that includes invoking a validator 135 of the identity management domain 130. In some embodiments, to invoke the validator 135, the workflow service 114 may send a code validation request at step 4 to the validator 135 of a dynamic code authentication server 134, e.g., via a suitable API or other suitable interfacing technology.

In some embodiments, the code validation request may include the authorization request, or a subset of the attributes of the authorization request, such as, e.g., the identifier and dynamic code. In some embodiments, the dynamic authentication server 134 may extract the identifier and the dynamic code, among other attributes, from the code validation request.

In some embodiments, the dynamic code authentication server 134 may identify a user identity 131 associated with the identifier in order to validate the dynamic code with respect to the user identity 131 of the user. As a result, the dynamic code authentication server 134 may access the user identity 131.

In some embodiments, the user identity 131 may be a user profile, a secured sovereign identity (SSI), or any other data structure for storing user credentials. In some embodiments, one of the user credentials may include a dynamic key 132. The dynamic key 132 is used to recalculate a dynamic code according to the same cryptographic algorithm used to generate the dynamic code of the operation request at step 1. In some embodiments, the cryptographic algorithm may include, e.g., a hash, a one-way compression, or other suitable algorithm In some embodiments, the user device 150 may provide the dynamic key 132 to the identity management domain 130, upon generating the operation request of step 1. Alternatively, the user device 150 and the identity management domain 130 may have shared the dynamic key ahead of time (e.g., through periodic synchronization with new dynamic keys or one time at the creation of the user identity 131 or on demand upon instruction by the user device 150 or identity management domain 130, etc.). For example, the identity management domain 130 may issue the dynamic key 132 to the user device 150, or the user device 150 may generate the dynamic key 132 and provide the dynamic key and/or a copy of the dynamic key 132 to the identity management domain 130.

In some embodiments, similar to the user device 150, the validator 135 may use the dynamic key 132 of the user identity 131 to generate a recalculated dynamic code based on the dynamic key 132. In some embodiments, the validator 135 may use the cryptographic algorithm and a random or pseudorandom number to generate a temporary dynamic code specific to the operation. In some embodiments, the random or pseudorandom number may include any suitable variable input that varies based on the operation request. For example, the random or pseudorandom number may include a time-based value, an operation identifier-based value, a counter-based value, or any other suitable value that varies with the operation. In some embodiments, the cryptographic algorithm and variable input ensures that the dynamic code can be generated at the user device 150 to formulate the operation request and then recalculated by the identify management domain 130 to produce equivalent values.

Accordingly, in some embodiments, the validator may recalculate the dynamic code based on the dynamic key 132, the variable input and the cryptographic algorithm. Where the recalculated dynamic code is equivalent to the dynamic code in the code validation request, the dynamic key 132 and the variable input must be equivalent, thus validating the user.

In some embodiments, based on the results of the validator 135, the dynamic code authentication server 134 may return a code validation acknowledgement at step 5 to the access control server 113. In some embodiments, the code validation acknowledgement includes an indicator that indicates whether the dynamic code is validated as authentic.

In some embodiments, the workflow service 114 may use the code validation acknowledgement to determine an authentication status of the authentication request. For example, the workflow service 114 may determine that the authentication status is that the authorization request is authenticated based on the valid dynamic code. In another example, the workflow service 114 may perform additional authentication steps based on an invalid dynamic code. In some embodiments, regardless of whether the dynamic code is valid or invalid, the workflow service 114 may perform additional authentication checks, such as, e.g., fraud checks, identity verification checks, permissions checks, balance checks, etc.

In some embodiments, where the user profile 111 is not enrolled, the workflow service 114 may implement an authentication workflow that does not take into account validation of the dynamic code. For example, the workflow service 114 not invoke the validator 135, or the workflow service 114 may be configured to always invoke the validator 135 but ignore a determination of invalidity of the dynamic code in lieu of a validation by the workflow service 114 of a static code or other security mechanism. Where the workflow service is configured to always invoke the validator 135 and the determination is of a valid dynamic code, the workflow service 114 may ignore or omit any validation test of a static code in lieu of the validation of the dynamic code by the validator 135.

In some embodiments, the access control server 113 may return an authorization acknowledgement at step 6 to the directory server 121 indicating the authentication status in response to the authorization request of step 3, e.g., via the same or a different API or other suitable interfacing technology.

In some embodiments, the directory server 121 may identify the source initiator 141 in the acquirer domain 140 and forward the authentication acknowledgement at step 7 to the initiator 141 associated with the authorization request, e.g., via a suitable API or other suitable interfacing technology.

Figure 2A:
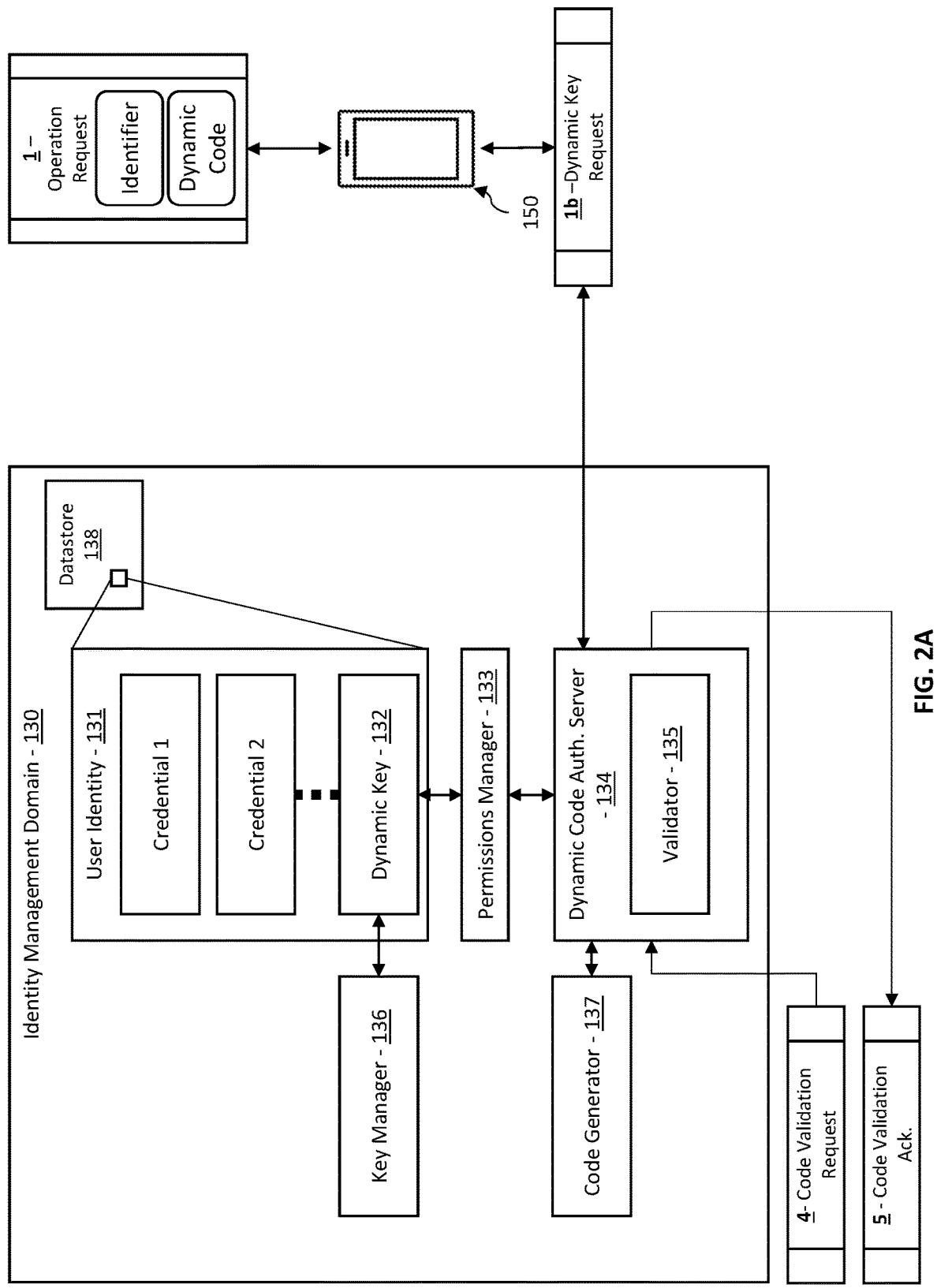
FIG. 2A and FIG. 2B illustrate dynamic key synchronization between a user device and the identity management domain 130 to incorporates a dynamic code validation protocol into an electronic operation authorization scheme for more secure operation authorization and execution in accordance with one or more embodiments of the present disclosure.
Figure 2B:
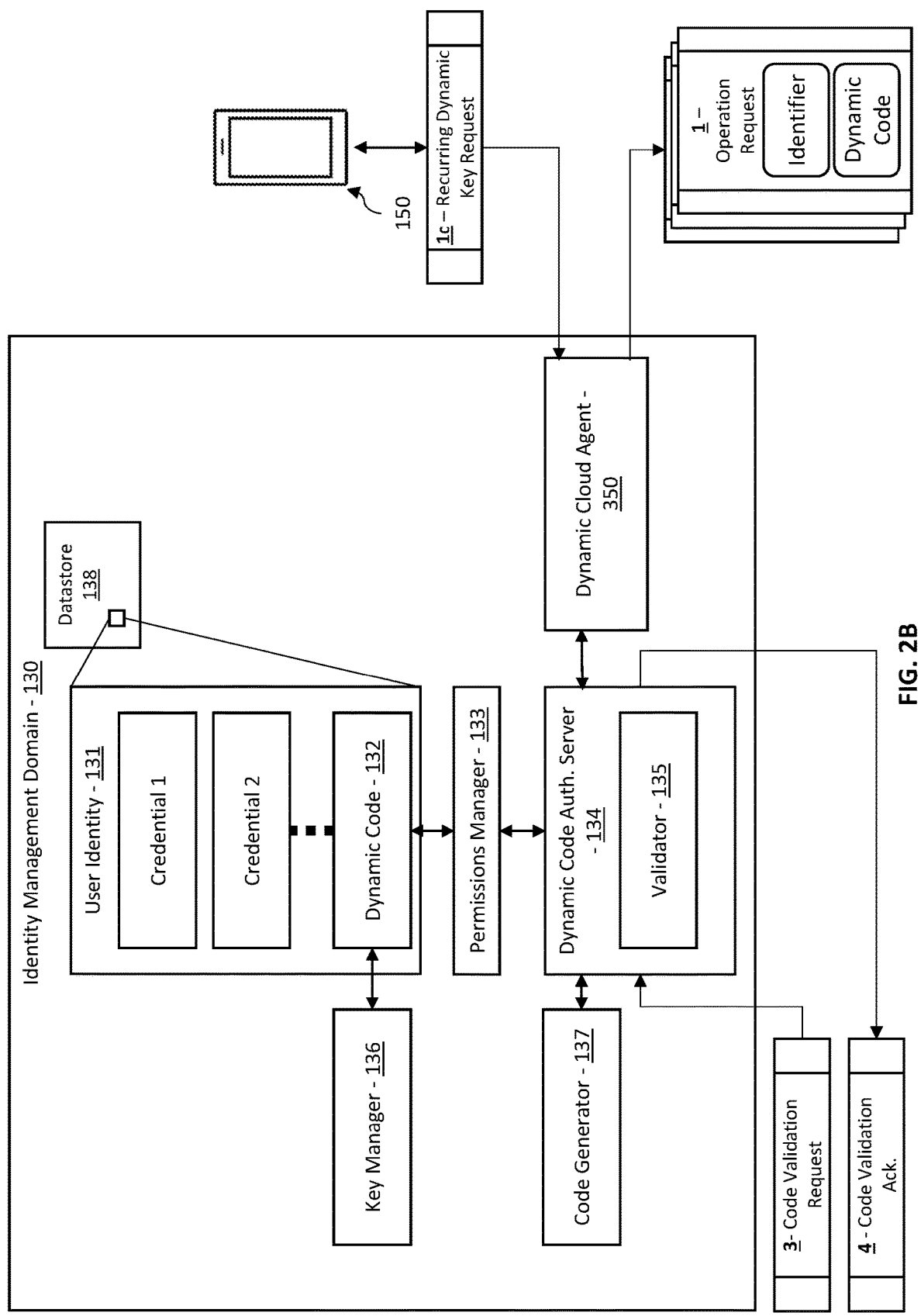

The initiator 141 uses the authentication status of the authorization acknowledgement to determine whether to perform the operation associated with the operation request. In some embodiments, where the authentication status is that the authorization request is authentic, then the initiator 141 initiates the operation. Otherwise, the initiator 141 cancels or declines the operation FIG. 2A and FIG. 2B illustrate dynamic key synchronization between a user device and the identity management domain 130 to incorporates a dynamic code validation protocol into an electronic operation authorization scheme for more secure operation authorization and execution in accordance with one or more embodiments of the present disclosure.

In some embodiments, the dynamic code authentication server 134 may receive the code validation request of step 4, e.g., via a suitable API. As described above, the dynamic code authentication server 134 may implement the validator 134 to test the dynamic code in the code validation request and verify the validity of the dynamic code.

In some embodiments, to validate the dynamic code, the validator 135 may recalculate the dynamic code from a dynamic key 132 in the user identity 131 using a code generator 137. The user identity 131 is depicted here as being stored in the datastore 138 for the identity management domain 130. But the user identity 131 may be removed from the identity management domain 130 and stored on the user device 150 with a copy of the dynamic key 132 stored in the datastore 138 for use by the code generator 137.

In some embodiments, in order to access the dynamic key 132 associated with the user identity 131, the dynamic code authentication server 134 may use a permissions manager 133. In some embodiments, the permissions manager 133 of the identity management domain 130 may effectuate strong access control to ensure only the user may generate the dynamic codes from the dynamic key 132. In some embodiments, the permissions manager 133 may store the dynamic key 132 in two places, with one copy stored in the datastore 138 for verification purposes, e.g., under a strong access control mechanism such as a Hardware Security Module (HSM). In some embodiment, the second storage location may be a user copy encrypted with a password-derived key (e.g., as described below with reference to FIG. 6). In some embodiments, the user copy may be only decrypted temporarily to allow generation of a dynamic code. In particular, the user copy may reside on the user device 150 in encrypted form. To decrypt the user copy, the user would need to enter a strong password. In some embodiments, using the strong password a symmetric key may be derived and used to decrypt a private asymmetric key. The private asymmetric key may then be used to decrypt the credential containing the dynamic key 132. In some embodiments, the permissions manager 133 may implement variations on the above, including, e.g., the number and/or type of keys and the authentication mechanism, e.g., biometric authentication could be used instead of a password-derived key to decrypt the dynamic key.

In some embodiments, the user identity 131 may include a secured profile or object for storing user data, such as credentials. In some embodiments, credentials may include identification documents or other user specific data, such as, e.g., government identification, passport, medical records, personal private information, financial account data, passwords, credit card details, debit card details, biometric identification, among other data and combinations thereof.

In some embodiments, a credential or part of a credential of the user identity 131 may include a dynamic key 132. In some embodiments, the dynamic key 132 may include a secret used for generating dynamic codes specific to the user of the user identity 131. In some embodiments, a key manager 136 of the identity management service 130 may generate keys for user identities 131 associated with the identity management service. Upon generating a dynamic key 132 for the user identity 131, the key manager 136 may embed the dynamic key 132 in the user identity 131 and/or store a copy linked to the user identity 131. In some embodiments, the embedding may be performed using, e.g., JSON or any other suitable data interchange format, e.g., utilizing key-value pairs or other formatting or any combination thereof.

In some embodiments, the key for the dynamic CVV2 operations would be stored on a blockchain or other distributed database. In this case, the credential would likely use JSON-LD (JSON Linked Data) format credentials to include a reference to the secret.

In some embodiments, the user device 150 and the key manager 136 may interact to produce and synchronize the dynamic key 132 in an online manner or in an offline manner, or any combination thereof. In some embodiments, the generation of the dynamic key 132 may be generated unilateral or multilateral, such as, e.g., by the identity management domain 130, by an entity in the user domain (e.g., via the user device 150 or other device), by two (or more parties) jointly, such as through a multi-party protocol, obtained from an external source of randomness, or may be pre-generated, or by any other suitable mechanism or any combination thereof.

In some embodiments, the key manager 136 may embed the dynamic key 132 in a credential of the user identity 131, or the key manager 136 may be 'split' the dynamic key 132 across multiple credentials, transmit or retrieve the dynamic key 132 independently of any credentials, associate the dynamic key 132 with a credential by way of a reference to the dynamic key 132 contained within a credential, or by any other suitable technique for storing and access the dynamic key 132 with the user identity 131.

In some embodiments, the copy of the dynamic key 132 stored in the identity management domain 130 may be stored outside of the identity management domain 130 by an entity or in a domain that enables entities in the identity management domain 130 to retrieve the dynamic key 132.

In some embodiments, the user identity 131 may include, e.g., a secured sovereign identity (SSI). In some embodiments, SSI centers around individuals having control over their digital identities and personal data instead of relying on identity providers (e.g., Google, Facebook, etc.) to the extent that they do presently.

In some embodiments, an SSI may provide a secure digital wallet for storing and using SSI credentials, allowing individuals to prove aspects of their identity, use blockchain technology (in several forms) for resilient accessibility and verification of credentials and certificates, and implement advanced cryptography, including zero-knowledge proofs and multi-party computation for enhanced privacy, leakage-resistant disclosure, and distributed key management. In some embodiments, to accomplish these improvements, the identity management domain 130 is designed and implemented following SSI principles, including adhering to the Hyperledger *Aries* standards framework for SSI interoperability. However, other SSI standards frameworks may be implemented, including public and/or proprietary frameworks. Thus, while the user experience (on both cardholder and issuer sides) is intentionally very simple and transparent, the underlying identity management domain 130 platform is a future-proof, extensible SSI platform, allowing widespread adoption of SSI and positioning it to provide additional services via the framework now and in the future.

In some embodiments, the user identity 131 and credentials therein may be stored in the datastore 138 of the identity management domain 130. In some embodiments, rather than persistently storing the user identity 131 in the identity management domain 130, the identity management domain 131 may rely on communication with the user device 150 to obtain credentials. The user's credentials may be generated in the identity management domain 131 but are not stored. Rather, upon generating the credentials, the credentials may be delivered to a user's digital wallet locally stored on the user device. The identity management domain 131 may retain a mapping between the dynamic key 132 and the user identity 131 and/or a credential therein (e.g., a credit card or credit card number, financial account number, user identifier such as a name, number, email, biometric identification, or other, or any combination thereof).

In some embodiments, the user identity 131 and/or the mapping between the copy of the dynamic key 132 and the user identity 131 may be stored in a datastore 138. In some embodiments, the datastore 138 may include, e.g., a suitable memory or storage solutions for maintaining electronic data representing the activity histories for each account. For example, the datastore 138 may include database technology such as, e.g., a centralized or distributed database, cloud storage platform, decentralized system, server, or server system, among other storage systems. In some embodiments, the datastore 138 may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, the datastore 138 may be configured interact and/or to store data, such as the user identity 131 and/or credentials (individually or collectively) thereof, in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. In some embodiments, the blockchain may store one or more credentials in encrypted form, identity credentials (e.g., SSI credentials), transaction records recording operations validated by the dynamic code authentication server 134, account recovery information, lookup, and resolution of decentralized identification (DID) for credential verification and issuance, trust anchoring for credentials issuers, among other data and applications thereof.

For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the identity management domain 130 may include a code generator 137 that uses the dynamic key 132 of a user identity 131 to validate the dynamic code of the code validation request. In some embodiments, the dynamic code authentication server 134 receives the code validation request of step 3 and extracts the dynamic code and the identity. In some embodiments, because the dynamic code and the identity were specified by the user in the operation request of step 1, the dynamic code represents a cryptographically generated code associated with the user identity 131. Accordingly, by recalculating the dynamic code at the identity management domain 130, the validator 135 can validate the dynamic code as a valid credential identity of the user.

Accordingly, in some embodiments, the validator 135 may use the identity to access the user identity 131 and/or the copy of the dynamic code 132 associated with the user device 150. Accordingly, in some embodiments, the dynamic code authentication server 134 may query, with the identity, the datastore 138 for the user identity 131 and/or the copy of the dynamic code 132. The datastore 138 may then return the user identity 131 and/or the copy of the dynamic code 132 associated with the identity.

In some embodiments, the validator 135 may access the dynamic key 132 of the user identity 131 via the permissions manager 133. In some embodiments, according to the access control implemented by the permissions manager 133, the validator 135 may be given access to the dynamic key 132.

In some embodiments, to test the dynamic code of the code validation request, the validator 135 may use the code generator 137 to recalculate the dynamic code based on the dynamic key 132. In some embodiments, the code generator 137 may employ a pseudorandom function that include a Pseudo-Random Number Generator (PRNG) seeded with a current time window. Alternatively, or in addition, the pseudorandom function 403 may include a True Random Number Generator (TRNG) such as a quantum sourced TRNG, a one-time-pad (OTP) or any other scheme that provides Existential Unforgeability under Chosen Message Attack (EUF-CMA) or any combination thereof. The pseudorandom function utilizes the current time window to generate a deterministic pseudo-random number which may be combined with the dynamic key 132 to generate a hash that is unique to the user and to the current time window. Thus, in a different time window and/or with the wrong dynamic key 132, the hash would be different than with the dynamic key and the current time window.

In some embodiments, any suitable number and nature of inputs into the pseudorandom function may be employed. In some embodiments, a time window may an input as described above. In some embodiments, the code generator 137 may employ other inputs, such as, e.g., transaction amount, a counter, sequence or other suitable value or any combination thereof. For example, a counter or sequence may be maintained, e.g., in the datastore 138 of the identity management domain 130 and used in addition to or in place of the time window. Other alternatives may include linking dynamic code generations to each other, in a blockchain-like manner, or any other suitable technique to provide a way for the verifier to independently verify the validity of the code, by using an a-priori known input to the calculation. This input could be the current time, a counter, and/or a hash of a previous code.

In some embodiments, the hash may include a cryptographic hash such as Format Preserving Encryption (FPE), Hash-based Message Authentication Code (HMAC), Zero Knowledge Proof (ZKP), or any other suitable hashing technique for creating a unique verifiable output based on the current time window and the dynamic key.

In some embodiments, the hash may be provided to a processing function to extract the dynamic code from the hash. In some embodiments, the processing function may include, e.g., processing to make the dynamic code compatible with pre-existing authentication systems, such as, e.g., a one-time-password framework, CVV or CVV2, or other code-based authentication scheme. Accordingly, in some embodiments, the processing function may truncate the hash to a predetermined length such as, e.g., 3 or 4 digits in length, for example for where the dynamic code is a dynamic CVV for a credit card or debit card transaction. In some embodiments, the processing function can remove all but the predetermined length of digits. For example, the processing function may, e.g., remove all but the last predetermined number of digits, remove all but the first predetermined number of digits, randomly selected the predetermined number of digits from the hash, or by any other suitable truncating technique. In some embodiment, the processing function may filter any non-numeric characters and symbols and convert decimals to whole integers. As a result, the processing function may extract the dynamic code according to a defined sequence of processing of the hash.

In some embodiments, as described above, the cryptographic algorithm may be time based. Thus, occasionally, the dynamic code may have been generated during an earlier time period that has since expired since the code validation request of step 3 is received by at the identity management domain 130. Thus, in case the dynamic code and the recalculated dynamic code are not equivalent due to an expiration of the dynamic code as a result of the time delay, the validator 135 uses the code generator 137 to recalculate the dynamic code again with a time period one interval earlier, e.g., according to Unix time or other time-keeping mechanism. In some embodiments, where the dynamic code and the new recalculated dynamic code are equivalent, the validator 135 validates the dynamic code and returns the code validation acknowledgement of step 4 indicating the valid dynamic code In some embodiments, there may be circumstances where the issuer domain 110 indicates that the user profile 111 is enrolled with the dynamic code validation protocol, but the user has cancelled or otherwise ended the enrollment at the identity management domain 130. Accordingly, in some embodiments, the code in the operation request, and as a result the authorization request and code validation request, would be the static code for legacy operation authorization processes.

In some embodiments, the validator 135 may detect that the static code has been provided. In some embodiments, to do so, the code generator 137 may feature a means of avoiding a clash with the static code. For example, out of 1,000 possible 3-digit dynamic codes, only 999 would be permissible to be generated by the code generator 137, with the static code never being generated. Accordingly, the static code may be detected by the validator 135 and treated as a special case. The code validation acknowledgement of step 5 may include a flag or other indication to the issuer domain 130 as possibly-valid, possibly a static code, approve-at-own-risk, or other suitable indication.

In some embodiments, the datastore 138 may include an operation record associated with the user identity 131. In some embodiments, the operation record may be stored in the user identity 131, either within the datastore 138 or on the user device 150. However, similar to the dynamic key 132, the operation record may be stored in the datastore 138 and linked to the user identity 131 via mapping. Accordingly, the user identity 131 may be stored on the user device 150 with or without the operation record while a copy of the operation is stored in the datastore 138 and mapped to the user identity 131.

In some embodiments, the operation record may include an entry of each received code validation request, the parameters represented therein (e.g., the identity, the dynamic code, the operation type, the operation quantity, any other entities associated therewith, a date, a time, a location, etc.), as well as a result of the code validation. For example, the entry for a particular operation record may include an indication of whether the code of the code validation request and the recalculated dynamic code based on the dynamic key 132 of the user identity 131 are equivalent. The entry may also specify the code extracted from the code validation request and the recalculated dynamic code. As a result, the datastore 138 may store for each user an operation record that forms an auditable record of operations with codes validated or invalidated in the identity management domain 130.

In some embodiments, the operation record may be provided to, e.g., the issue domain 110 upon request by a suitable API or periodically by a predetermined time interval. In some embodiments, the permission manager 133 may enforce access control to the operation record to ensure a potential accessor is permissioned to access the operation record. For example, the operation record may be encrypted, stored on a blockchain, password controlled, or by any other cryptographic access control scheme. In some embodiments, where the operation record is stored on the user device 150, the permissions manager 133 may identify the user identity 131 based on an access request specifying a user, user profile, user identifier, the user identity 131, or other suitable user identification. In some embodiments, the permissions manager 133 may then cryptographically connect the potential accessor (e.g., the access control server 113) to the user device 150 via a cryptographic channel provide the operation record.

Referring to FIG. 2A, the user device 150 syncs the dynamic key 132 at step 1b with the datastore 138 of the identity management domain 130.

In some embodiments, the user device 150 may store the user identity 131 in parallel with or instead of the datastore 138 of the identity management domain 130. As described above, the datastore 138 may include the user identity 131 accessible to the user device 150 or may store a copy of the dynamic key 132 and export the user identity 131 to the user device 150.

In some embodiments, the dynamic key 132 is used to enable the dynamic codes to validate operation requests when the dynamic code provided in the operation request is equivalent to a recalculated dynamic code generated by the validator 135. Thus, the dynamic key 132 is a key specific to the user identity 131 to cryptographically authenticate user-initiated operations. Accordingly, by synchronizing the dynamic key and using the same cryptographic algorithm, both the user device 150 and the code generation 137 may generate the same dynamic code, ensuring that the dynamic code provided in the operation request is the same the recalculated dynamic code.

In some embodiments, to synchronize the dynamic key 132 and ensure it is equivalent on the user device 150 and on the identity management domain 130, a synchronization process may occur periodically, e.g., upon generating a new dynamic key (e.g., when initially enrolling the user, when a current dynamic key expires, is compromised, is rotated, etc.).

In some embodiments, the key manager 136 may generate a new dynamic key, embed the new dynamic key in the user identity 131 as a credential, e.g., replacing the dynamic key 132, and send the new dynamic key to the user device 150. In some embodiments, the key manager 136 may provide the dynamic key 132 to the user device 150 using an online schemes. An example of an online scheme may include where the user may download or already have installed to the user device 150 a software application for creating and storing a digital wallet. The software application may generate and communicate the dynamic key request of step 1b to the dynamic code authentication server 134.

In some embodiments, the user device 150 may generate the user identity 131 in an offline scheme and then generate the dynamic code 132 in either an online or an offline scheme. In an example of an offline scheme, the user may be provided with a computer readable indicia or alphanumeric code that the user may input into the software application to create the user identity 131 and/or the dynamic code 132 on the user device 150. In some embodiments, for the offline scheme the user device 150 may include a separate key manager 136 to locally generate the dynamic key 132.

In some embodiments, the user device 150 may issue a dynamic key request on demand based on user input for on-demand synchronization, e.g., upon a user requesting a new dynamic key (e.g., to validate a new operation, for temporary use, etc.). In response, the dynamic code authentication server 134 may generate a new dynamic key, embed the new dynamic key in the user identity 131 as a credential, e.g., replacing the dynamic key 132, and send the new dynamic key to the user device 150

For example, to create a new operation request, the user device 150 may transmit a dynamic code request to the dynamic code authentication server 134. In response, the permissions manager 133 may identify the user identity 131 associated with the user device 150 and may provide access to the user identity 131. In some embodiments, the dynamic key 132 and the key manager 136 may determine whether the dynamic key 132 needs to be replaced.

In some embodiments, where the dynamic key 132 needs to be replaced (e.g., due becoming expired, compromised, or due for rotation), the key manager 136 may generate the new dynamic key according to a cryptographic algorithm. Upon creation, the permissions manager 133 may allow the dynamic code authentication server 134 to return the dynamic key 132 to the user device 150. In some embodiments, to return the dynamic key 132, the key manager 136 may first embed the new dynamic key in the user identity 131. The dynamic code authentication server 134 may then export the user identity 131 to the user device 150 and store a copy of the new dynamic code 132 in the datastore 138. Alternatively, or in addition, the dynamic code authentication server 134 may then export the new dynamic key 132 to the user device 150 and store a copy of the new dynamic code 132 in the datastore 138.

In some embodiments, upon receipt of the new dynamic key, the user device 150 may produce or be used to produce an operation request with a dynamic code generated based on the new dynamic key 132. For example, the user device 150 may transfer the dynamic code to the initiator 141 electronically. In some embodiments, the user device 150 may include software instructions that instruct the user device 150 to transfer the dynamic code to the initiator via a wireless transmission technique upon detection of the initiator 141 via the wireless transmission technique. For example, the user device 150 and the initiator 141 may communicate via, e.g., near field communication (NFC), radio frequency identification (RFID), WiFi, Bluetooth, or other suitable communication method. During the communication via the wireless transmission technique, the user device 150 may receive from the initiator 141 an operation request and the user device 150 may automatically return the operation request with an approval to initiate the operation and with the dynamic code and the identifier. In some embodiments, an example of the wireless transmission technique may include a tap-n-pay exchange via NFC, where the tap-n-pay is adapted to provide to the initiator 141 the dynamic code in place of a CVV or CVV2.

In some embodiments, the new dynamic key may be provided to the initiator 141 by manual user input. For example, the user may select to generate and view the dynamic code, and upon display on the user device 150, may manually input the dynamic code into a field for an authentication code.

Referring to FIG. 2B, a cloud agent 350 is used to validate operations with the identity management domain 130 on behalf of the user device 150 (e.g., for recurring operations, etc.).

In some embodiments, the user of the present dynamic code verification protocol may configure a 'cloud agent' 350. In some embodiments, the cloud agent 350 includes a persistent program running on behalf of the user in the identity management domain 130. The user may configure the cloud agent 350 with a policy or policies that define parameters to allow it to approve or reject transactions on behalf of the user.

In some embodiments, the policy may include restrictions to operation quantity (e.g., payment amount, payment volume, file transfer limits according to bandwidth or memory, file transfer limits according number of files, account access attempts, etc.)

In some embodiments, the policy may include entity restrictions that define one or more entities with which operations may or may not be performed. For example, the user may define a policy for allowing an operation with a particular entity, or for denying an operation with a particular entity. In some embodiments, the policy may define any combination of one or more entities for which to allow and to deny operations.

In some embodiments, the policy may include an operation type restriction that define one or more types of operations which may or may not be performed. For example, the user may define a policy for allowing a particular type of operation, or for denying a particular type of operation. In some embodiments, the policy may define any combination of one or more types of operations for which to allow and to deny.

In some embodiments, the operation request may originate from an initiator 141 in a particular location. The cloud agent 350 may determine a location associated with the initiator 141 (e.g., a location of a payment, a location of an ATM-based account access, etc.) and the user may configure the cloud agent 350 to have restrictions based on location (e.g., geographic location, region, town, address, latitude-longitude, etc.).

In some embodiments, the policy may include time-based restrictions. For example, the cloud agent 350 may be configured to only provide dynamic codes for operations within a user-defined period of time, such as, e.g., a recurring time of day, recurring day(s) of the week, recurring day(s) of the month, over a single user-defined range of time(s) and date(s), on time and/or date other than a user-defined recurring date/time, single date/time, or any other suitable time restrictions or any combination thereof.

In some embodiments, the one or more policies may include any combination of one or more quantity, entity, operation type, time, and locations restrictions among other suitable policies.

In some embodiments, the policy may be defined by a whitelist of parameters, a blacklist of parameters or any combination thereof.

Accordingly, in some embodiments, when an initiator 141 or other entity or device attempts to engage in an operation, the initiator 141 or other entity and/or device may provide an initial request to the user's cloud agent 350 to initiate an operation. The cloud agent 350 may determine, based on the initial request, whether the operation is within the scope of the policy. If the operation is within the scope of the policy, the cloud agent 350 may generate the operation request with a dynamic code according to the policy. Otherwise, the cloud agent 350 may reject the initial request.

In some embodiments, the cloud agent 350 may be employed for validation of a code validation request instead of or in addition to generation of the dynamic code. In some embodiments, some operations are not amenable to verification with a dynamic code, such recurring transactions, automatic uploads or social media posts, or other operations needing authorization. Accordingly, in some embodiments, upon receipt of the code validation request, the validator 135 may issue an initial request to the cloud agent 350. The cloud agent 350 may test attributes of the code validation request against the policy or policies. Where the attributes fall within the scope of the predefined policies, the approval from the cloud agent 350 based on the policy or policies may be used in place of further verification techniques including validating the dynamic code.

In some embodiments, for the cloud agent 350 to implement a policy for validation, the workflow service 114 may be configured to include attributes of the authorization request in the code validation request, such as, e.g., a time, quantity, location, entity, type, or other attribute associated with the operation or any combination thereof.

Similar to FIG. 2A, the user device 150 may request new dynamic keys and/or dynamic codes, e.g., periodically or on-demand.

In some embodiments, the user device 150 may also employ a dynamic cloud agent 350 to utilize the dynamic key to generate subsequent dynamic codes for producing subsequent operation requests on behalf of the user device 150. Thus, the user device 150 may send a recurring dynamic code request to the dynamic code authentication server 134 that requests the cloud agent to produce recurring dynamic codes for recurring operation requests, including a first operation request of step 1 and subsequent operation requests with new subsequent dynamic codes.

In some embodiments, for each recurring dynamic code request of each recurring operation request, the dynamic code authentication server 134 may generate an associated recurring dynamic code. Accordingly, the permissions manager 133 identifies the user identity 131 associated with the user device 150 and may provide access to the user identity 131 and the key manager 136 may determine whether the dynamic key 132 needs to be replaced (e.g., due becoming expired, compromised, or due for rotation), the key manager 136 may generate the new dynamic key and embed the new dynamic key in the user identity 131 to replace the dynamic key 132.

As described above, the code generator 137 may employ the cryptographic algorithm to generate the dynamic code based on the new dynamic key 132. The permissions manager 133 may then allow the dynamic code authentication server 134 to return the dynamic code to the cloud agent 350 with an initiation instruction to produce the next recurring operation request. Accordingly, the cloud agent 350 may use the dynamic code to produce the next recurring operation request. In some embodiments, the recurring operation requests may be for subscriptions or other automated recurring payments.

In some embodiments, the cloud agent 350 may interface directly with a payment processing service. For example, the internet service 143 may be a payment processing service for a recurring payment (e.g., financial account billing, utility billing, subscriptions, etc.). Based on the schedule of the recurring payments, the cloud agent 350 may receive regular payment requests from the internet service 143. In response, the cloud agent 350 may generate the recurring dynamic code request to obtain from the dynamic code authentication server 134 a new dynamic code for a current payment, and generate the operation request to fulfill the payment request of the internet service 134

In some embodiments, the cloud agent 350 may interact with a browser or software application on the user device 150 and detect a code field of billing fields or other operation fields. In some embodiments, the cloud agent 350 may interface with the browser via, e.g., a browser extension or plug-in, and/or may interface with the software application using a software development kit (SDK) provided application add-on or plug-in.

In some embodiments, the cloud agent 350 may then identify a field for an authentication code (e.g., CVV, one time password, etc.). Upon detection, the cloud agent 350 generates the recurring dynamic code request to obtain from the dynamic code authentication server 134 a new dynamic code for the code field and autofills the code field with the dynamic code in order to produce the operation request. For example, the cloud agent 350 may autofill a Card Verification Value (CVV) field with the dynamic code.

Figure 3:
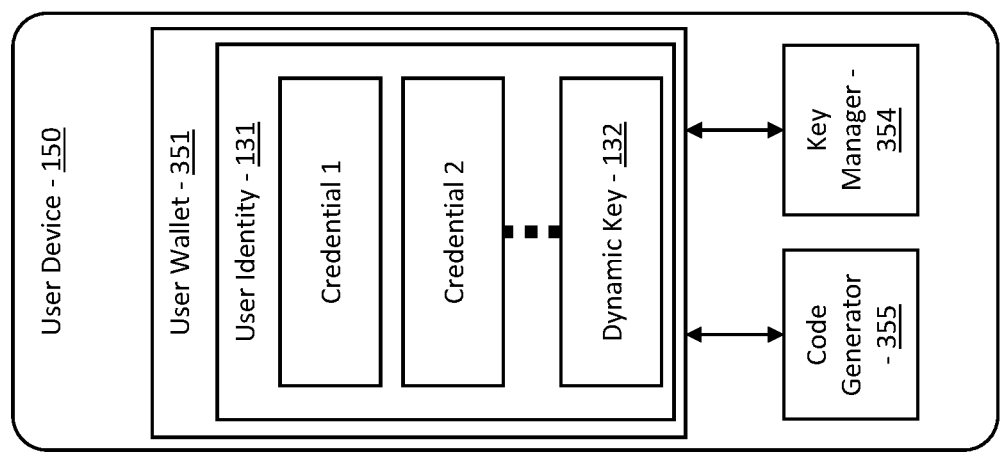
FIG. 3 illustrates a user device 150 with a locally stored user wallet 351 that has the user identity and dynamic key for a dynamic code validation protocol for more secure operation authorization and execution in accordance with one or more embodiments of the present disclosure.

FIG. 3 illustrates a user device 150 with a locally stored user wallet 351 that has the user identity and dynamic key for a dynamic code validation protocol for more secure operation authorization and execution in accordance with one or more embodiments of the present disclosure.

In some embodiments, upon generation of the user identity 131 by the identity management domain 130, the user identity 131 may be exported to a user wallet 351 on the user device 150 for local storage. In some embodiments, the user wallet 351 may include an encrypted digital wallet to ensure security and privacy of the credentials in the user identity. In some embodiments, the digital wallet 351, also known as e-wallet, may include an electronic device, online service, or software program that allows the user to make electronic transactions with another party bartering digital currency units for goods and services. This can include purchasing items on-line with a computer or using a smartphone to purchase something at a store. Money can be deposited in the digital wallet 351 prior to any transactions or, in other cases, an individual's bank account can be linked to the digital wallet. The user might also have credentials such as a driver's license, health card, biometric identification, loyalty card(s) and other ID documents stored within the wallet. The credentials can be passed to a recipient device wirelessly, e.g., via near field communication (NFC), RFID, Bluetooth, WiFi, or other suitable wireless communication technology.

In some embodiments, the user device 150 may include a code generator 355 to generate dynamic codes based on the dynamic key 132. In some embodiments, the code generator 355 may use the dynamic key 132 with a cryptographic algorithm and a random or pseudorandom number to generate a temporary dynamic code specific to an operation and the user. In some embodiments, the random or pseudorandom number may include any suitable variable input that varies based on the operation request. For example, the random or pseudorandom number may include a time-based value, an operation identifier-based value, a counter-based value, or any other suitable value that varies with the operation. Thus, using the cryptographic algorithm, the user-specific dynamic key 132 and the temporary variable input result in a deterministically-generated user-specific and operation-specific dynamic code that can be recreated for validation.

In some embodiments, the user device 150 may include a key manager 354. In some embodiments, key manager 354 may generate the dynamic key 132 for the user identity 131, including periodically or on-demand regenerating a new dynamic key 132. Upon generating a dynamic key 132 for the user identity 131, the key manager 354 may embed the dynamic key 132 in the user identity 131. In some embodiments, the embedding may be performed using, e.g., JSON or any other suitable data interchange format, e.g., utilizing key-value pairs or other formatting or any combination thereof.

In some embodiments, the key manager 354 and the identity management domain 130 may interact to produce and synchronize the dynamic key 132 in an online manner or in an offline manner, or any combination thereof. In some embodiments, the generation of the dynamic key 132 may be generated unilateral or multilateral, such as, e.g., by the identity management domain 130, by an entity in the user domain (e.g., via the user device 150 or other device), by two (or more parties) jointly, such as through a multi-party protocol, obtained from an external source of randomness, or may be pre-generated, or by any other suitable mechanism or any combination thereof.

In some embodiments, key manager 354 may embed the dynamic key 132 in a credential of the user identity 131, or the key manager 354 may be 'split' the dynamic key 132 across multiple credentials, transmit or retrieve the key manager 354 independently of any credentials, associate the dynamic key 132 with a credential by way of a reference to the dynamic key 132 contained within a credential, or by any other suitable technique for storing and access the dynamic key 132 with the user identity 131.

Figure 4A:
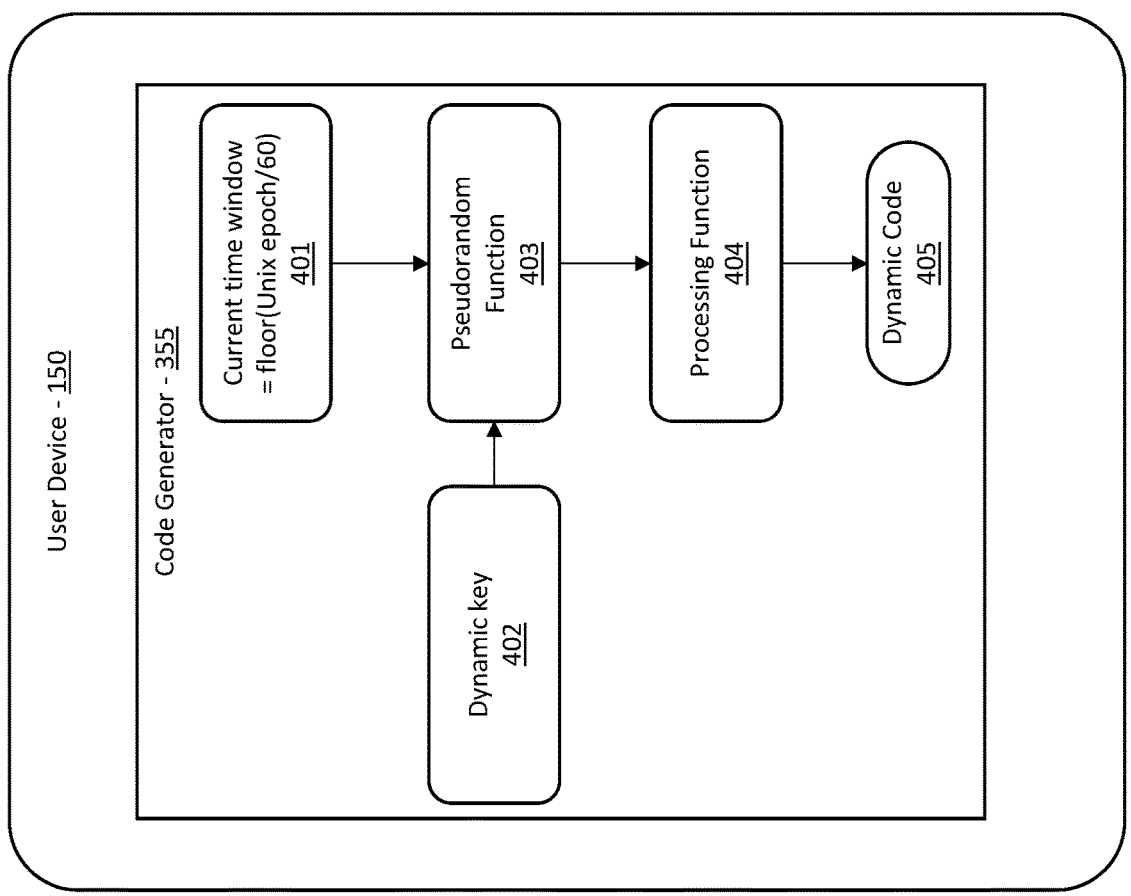
FIGS. 4A and 4B illustrate dynamic code generation to validate operations using a dynamic code validation protocol into an electronic operation authorization scheme for more secure operation authorization and execution in accordance with one or more embodiments of the present disclosure.
Figure 4B:
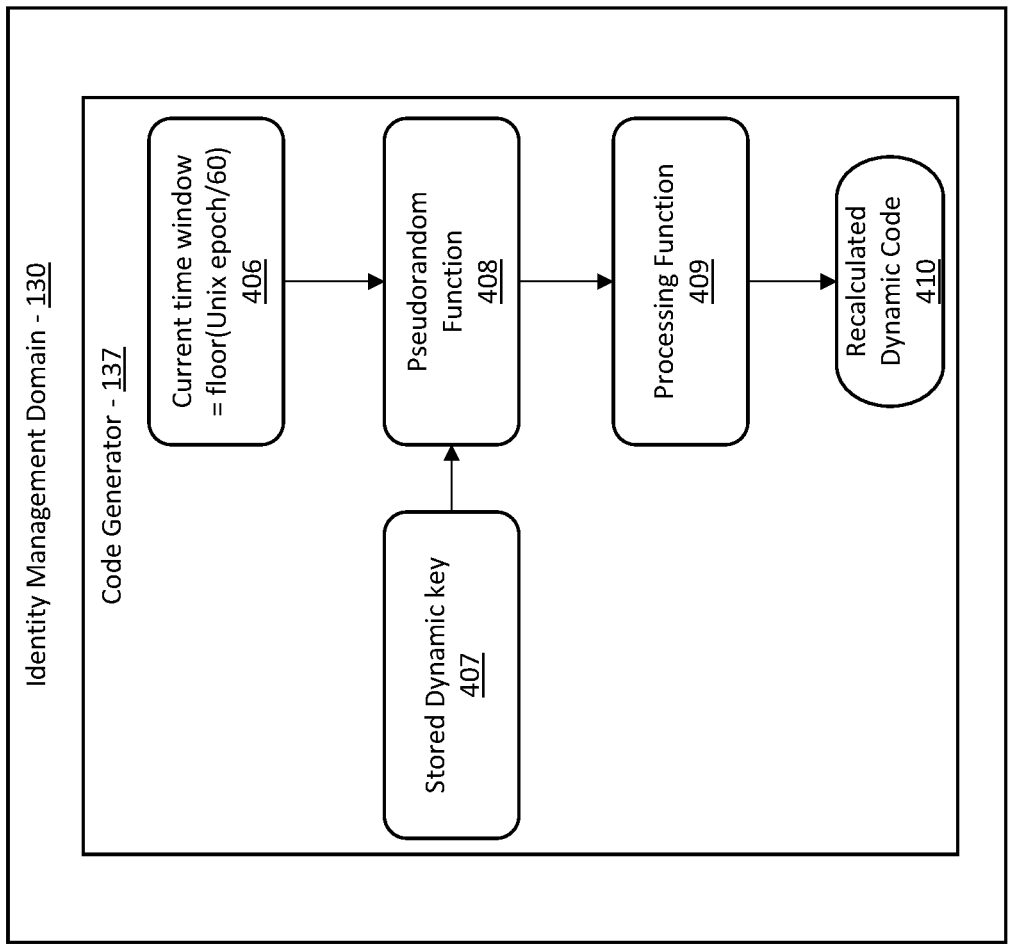

FIGS. 4A and 4B illustrate dynamic code generation to validate operations using a dynamic code validation protocol into an electronic operation authorization scheme for more secure operation authorization and execution in accordance with one or more embodiments of the present disclosure.

In some embodiments, to authenticate an operation, the user may provide a dynamic key generated by the user device 150 as part of the operation request. The operation of the operation request may then be authenticated by validating the dynamic code in the operation request against a recalculated dynamic code produced using an equivalent dynamic key at the identity management domain 130. Thus, both the user device 150 and the identity management domain 130 store copies of equivalent dynamic keys and employ a common encoding process to test whether the operation request originates from the user device 150.

In some embodiment, code generator 355 and the code generator 137 may employ a cryptographic algorithm for producing a dynamic code that varies dynamically. Accordingly, in some embodiments, the cryptographic algorithm may be configured to employ a varying value as input such that each dynamic code is different.

In some embodiments, the varying value may be a time-based value, a location-based value, a date-based value, or other value that may vary with each code generation. In some embodiments, to ensure each dynamic code is different, the varying value may be a time-based value, such as a time or a time window. While a specific time could be employed because the dynamic code is being generated on the user device 150 and then sent, via a sequence of domains and requests as discussed above with respect to FIG. 1, the code generator 137 of the identity management domain 130 may generate a recalculated code at a later time. As a result, the user device 150 and the identity management domain 130 will generate different dynamic codes due to the time difference resulting from various delays in the user input of the dynamic code and/or communication of the dynamic code across the various domains. Accordingly, the code generator 355 and the code generator 137 may employ a time window having a predetermined size. For example, the time window may be, e.g., 30 seconds, 60 seconds, two minutes, five minutes, ten minutes, or any other suitable time span to account for the delays yet also ensure the dynamic code is short lived enough to not be used twice. In some embodiments, the time window could be fixed or non-fixed in practice, e.g., it could be adaptively chosen based on false-negative rates in practice.

In some embodiments, the code generator 355 may determine the time window as a current time window 401 based on, e.g., a Unix time or on any other suitable time keeping mechanism. Based on the current time, the code generator 355 may round down to a nearest interval of the predetermined size (e.g., the nearest minute, the nearest half minute, the nearest even minute, the nearest odd minute, the nearest multiple of five, the nearest multiple of ten, etc.). In some embodiments, by rounding down, the code generator 355 effectively back-dates the input the cryptographic algorithm such that when the code generator 137 determines the time window, the input is valid until the next interval occurs.

In some embodiments, the code generator 355 may employ a pseudorandom function 403 that include a Pseudo-Random Number Generator (PRNG) seeded with the current time window 401. Alternatively, or in addition, the pseudo-random function 403 may include a True Random Number Generator (TRNG) such as a quantum sourced TRNG, a one-time-pad (OTP) or any other scheme that provides Existential Unforgeability under Chosen Message Attack (EUF-CMA) or any combination thereof. The pseudorandom function 403 utilizes the current time window 401 to generate a deterministic pseudo-random number which may be combined with the dynamic key 402 stored on the user device 150 to generate a hash that is unique to the user and to the current time window. Thus, in a different time window and/or with the wrong dynamic key, the hash would be different than with the dynamic key 402 and the current time window 401.

In some embodiments, the hash may include a cryptographic hash such as Format Preserving Encryption (FPE), Hash-based Message Authentication Code (HMAC), Zero Knowledge Proof (ZKP), or any other suitable hashing technique for creating a unique verifiable output based on the current time window 401 and the dynamic key 402.

In some embodiments, the hash may be provided to a processing function 404 to extract the dynamic code 405 from the hash. In some embodiments, the processing function 404 may include, e.g., processing to make the dynamic code 405 compatible pre-existing authentication systems, such as, e.g., a one-time-password framework, CVV or CVV2, or other code-based authentication scheme. Accordingly, in some embodiments, the processing function 404 may truncate the hash to a predetermined length such as, e.g., 3 or 4 digits in length, for example for where the dynamic code is a dynamic CVV for a credit card or debit card transaction. In some embodiments, the processing function 404 can remove all but the predetermined length of digits. For example, the processing function 404 may, e.g., remove all but the last predetermined number of digits, remove all but the first predetermined number of digits, randomly selected the predetermined number of digits from the hash, or by any other suitable truncating technique. In some embodiment, the processing function 404 may filter any non-numeric characters and symbols and convert decimals to whole integers. As a result, the processing function 404 may extract the dynamic code 405 according to a defined sequence of processing of the hash.

In some embodiments, the processing function 404 may also perform checks for uniqueness and permissible values. For example, the processing function 404 may filter dynamic codes 405 that match one or more predefined codes (e.g., a static CVV). Thus, the processing function 404 ensures that the dynamic code 405 does not equate to any impermissible codes. Other impermissible codes may include, e.g., consecutive dynamic code values for a given user, among others or any combination thereof.

In some embodiments, during validation, e.g., by the validator 134, the code generator 137 of the identity management domain 130 may utilize the stored dynamic key 407 associated with the user device 150 to recalculate the dynamic code 405. The operation of the operation request may be authenticated by validating the dynamic code 405 in the operation request against a recalculated dynamic code 410. Because the dynamic key 407 linked to the user device 150 is synchronized with and equivalent to the dynamic key 402 on the user device 150, the code generator 137 may use an equivalent cryptographic algorithm to produce the recalculated dynamic doe 410 that is equivalent to the dynamic code 405.

Accordingly, similar to the code generator 355, the code generator 137 may replicate the inputs of a same pseudorandom function 408 to the pseudorandom function 403. Thus, the code generator 137 may determine the time window as a current time window 406 based on, e.g., a Unix time or on any other suitable time keeping mechanism. Based on the current time, the code generator 137 may round down to a nearest interval of the predetermined size (e.g., the nearest minute, the nearest half minute, the nearest even minute, the nearest odd minute, the nearest multiple of five, the nearest multiple of ten, etc.). In some embodiments, by rounding down, the code generator 137 effectively back-dates the input the cryptographic algorithm to account for delays in receiving the code validation request.

In some embodiments, the code generator 137 may employ a pseudorandom function 410 that is equivalent to the pseudorandom function 403, such as, e.g., PRNG seeded with the current time window 406, a TRNG such as a quantum sourced TRNG, an OTP or any other scheme that provides Existential Unforgeability under Chosen Message Attack (EUF-CMA) or any combination thereof. The pseudorandom function 408 utilizes the current time window 406 to generate a deterministic pseudo-random number which may be combined with the stored dynamic key 407 to generate a hash that is unique to the user and to the current time window and is equivalent to the hash computed by the pseudorandom function 403 of the user device 150. Thus, in a different time window and/or with the wrong dynamic key, the hash would be different than with the dynamic key 402 and the current time window 401.

In some embodiments, the hash may include a cryptographic hash such as FPE, HMAC, ZKP, or any other suitable hashing technique used by the pseudorandom function 403.

In some embodiments, the hash may be provided to a processing function 409 to extract the recalculated dynamic code 410 from the hash. In some embodiments, the processing function 409 may include, e.g., processing that matches the processing function 404 to ensure equivalent dynamic codes for equivalent inputs. Accordingly, in some embodiments, the processing function 409 can remove all but the predetermined length of digits by, e.g., removing all but the last predetermined number of digits, removing all but the first predetermined number of digits, randomly selected the predetermined number of digits from the hash, or by any other suitable truncating technique. In some embodiment, the processing function 409 may filter any non-numeric characters and symbols and convert decimals to whole integers. As a result, the processing function 409 may extract the recalculated dynamic code 410 that is equivalent to the dynamic code 405 when the dynamic key 402 and the stored dynamic key 407 are equivalent and when the current time window 401 and the current time window 406 are equivalent.

In some embodiments, similar to the processing function 404, the processing function 409 may also perform checks for uniqueness and permissible values. For example, the processing function 404 may filter dynamic codes 405 that match one or more predefined codes (e.g., a static CVV). Thus, the processing function 404 ensures that the dynamic code 405 does not equate to any impermissible codes. Other impermissible codes may include, e.g., consecutive dynamic code values for a given user, among others or any combination thereof.

In some embodiments, the delays in receiving the code validation request may exceed the time window. For example, the user may delay in providing the dynamic code 401 for the operation request, network bottlenecks may result in delays greater than the size of the time window, or the code generator 355 may generate the dynamic code 405 at the end of the current time window 401 (e.g., at 58 seconds into the current minute) such that the code generator 137 determines a later time window when the code validation request is received. In some embodiments, to account for the possibility of the delays exceeding the time window, upon determining that the recalculated dynamic code 410 does not match the dynamic code 405, the validatory 134 may instruct the code generator 137 to perform a roll-back process to recompute the recalculated dynamic code 410 at an immediately preceding time window. Thus, the code generator 355 may generate a current time window 406 as the current time rounded down to the nearest interval and then reduced by one interval. The code generator 355 may then use the pseudorandom function 408 and the processing function 409 to re-generate the recalculated dynamic code 410. The dynamic code 405 may then be tested against the recalculated dynamic code 410. In some embodiments, the validator 134 may instruct the code generator 137 to perform the roll-back process only once, or any suitable number of times to account for delays without compromising the dynamic and secure validation of the dynamic code 405. Where the dynamic code 405 is not found to be equivalent to the recalculated dynamic code 401 after the allotted number of roll-back processes, then the validator 134 determines that the dynamic code 405 is invalid.

Figure 5:
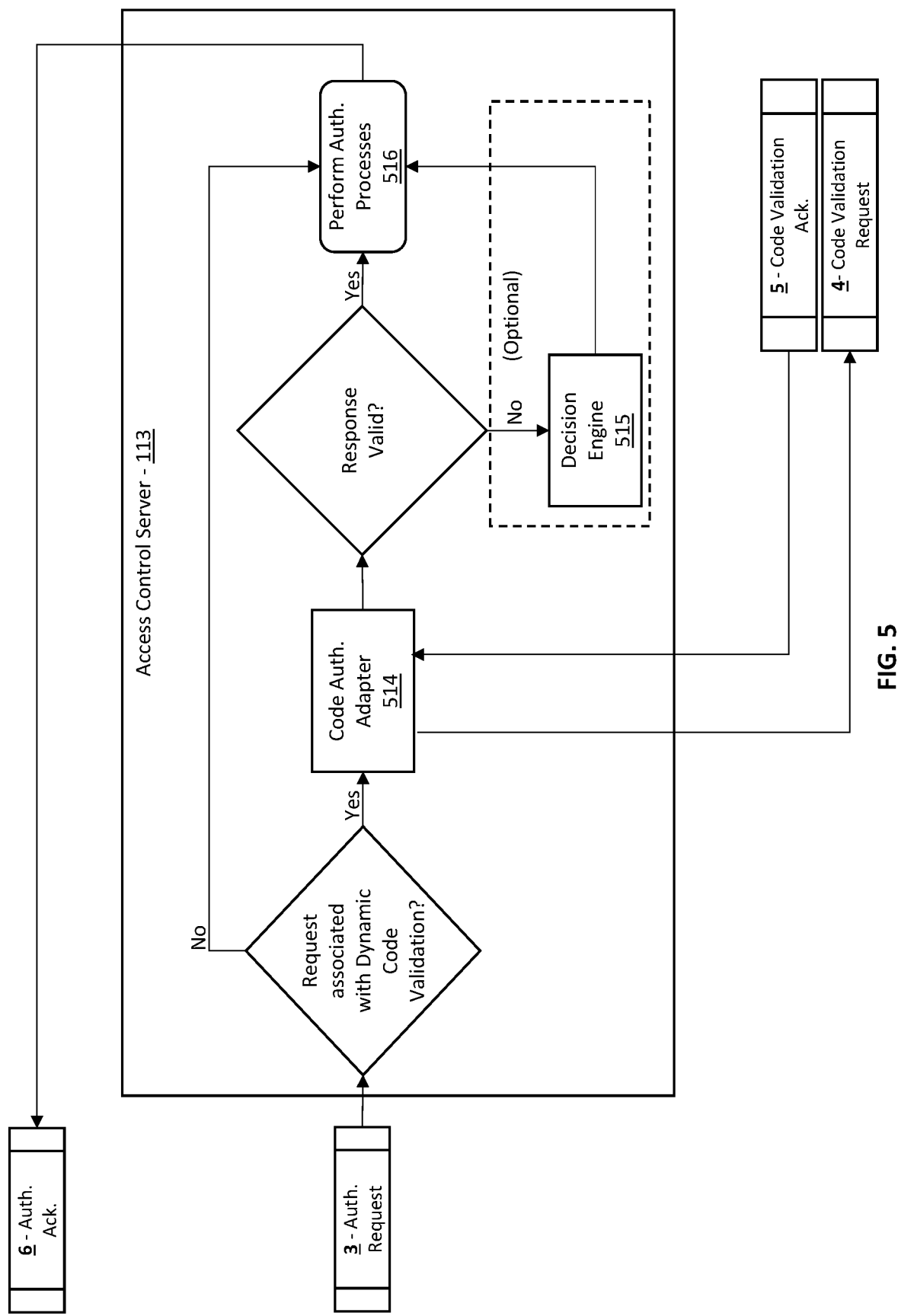
FIG. 5 illustrates an access control server adapted to integrate the dynamic code validation protocol into an electronic operation authorization scheme for more secure operation authorization and execution in accordance with one or more embodiments of the present disclosure.

FIG. 5 illustrates an access control server adapted to integrate the dynamic code validation protocol into an electronic operation authorization scheme for more secure operation authorization and execution in accordance with one or more embodiments of the present disclosure.

The access control server 113 receives the authorization request of step 2 and determines whether the request is associated with a dynamic code validation. In some embodiments, some users in the issuer domain 110 may enroll in the user of the dynamic codes of the identity management domain 130 and some may not. Thus, the access control server 113 may query the user data 112 in the user profile 111 associated with the authorization request. To do so, the access control server 113 may query the user profile 111 using the identifier in the authorization request. For example, the access control server 113 may access the mark indicating enrollment via, e.g., a look-up-table, database query, API call, or any other suitable mechanism or any combination thereof.

In some embodiments, where the user is enrolled, the access control server 113 implements an authentication workflow that includes invoking the validator 135 of the identity management domain 130 using a code authentication adapter 514. In some embodiments, the code authentication adapter 514 may send the code validation request at step 4 to the validator 135 of the dynamic code authentication server 134, e.g., via a suitable API or other suitable interfacing technology.

In some embodiments, where the user profile 111 is not enrolled, the access control server 113 may omit the code validation adapter 514 sending the code validation request.

In some embodiments, the access control server 113 may then receive the results of the validator 135 via the code validation acknowledgement of step 5. In some embodiments, the code validation acknowledgment includes an indicator that indicates whether the dynamic code is validated as authentic. In some embodiments, where the indicator indicates that the dynamic code is authentic, the access control server 113 may perform authentication processes 516 based on and/or in addition to the code validation acknowledgement such as, e.g., fraud checks, identity verification checks, permissions checks, balance checks, etc.

In some embodiments, where the code validation acknowledge indicates that the dynamic code is not valid, the access control server 113 may reject the authorization request based on the invalid dynamic code. In some embodiments, the access control server 114 may instead or in addition be configured to implement a decision engine 515. In some embodiments, the decision engine 515 may optionally be used as an input to the authorization processes 516.

In some embodiments, the access control server 113 may return an authorization acknowledgement at step 6 to the directory server 121 indicating the authentication status in response to the authorization request of step 3, e.g., via the same or a different API or other suitable interfacing technology.

Figure 6:
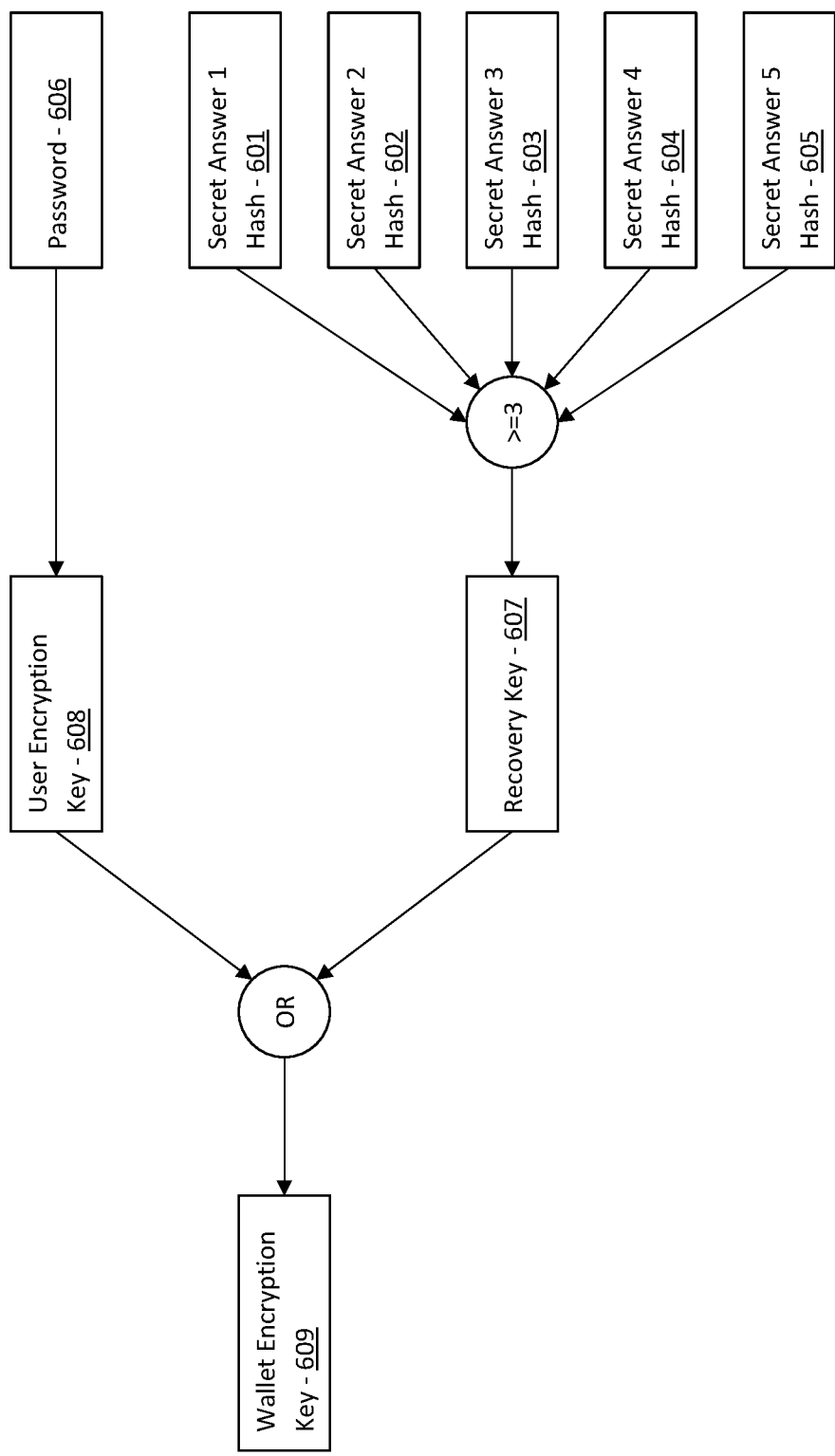
FIG. 6 illustrates encryption key generation and recovery for a digital wallet of a user identity by an identity management domain to incorporate a dynamic code validation protocol into an electronic operation authorization scheme for more secure operation authorization and execution in accordance with one or more embodiments of the present disclosure.

FIG. 6 illustrates encryption key generation and recover for a digital wallet of a user identity by an identity management domain to incorporate a dynamic code validation protocol into an electronic operation authorization scheme for more secure operation authorization and execution in accordance with one or more embodiments of the present disclosure.

In some embodiments, the user identity 131 may be stored in a digital wallet. In some embodiments, the digital wallet is secured using suitable encryption techniques, such as, e.g., Encrypted then MACed at rest, following the Authenticated Encryption (AE) principles. In some embodiments, to enable recovery of the digital wallet in the event the user loses the digital wallet on the user device 150 or forgets the password to access the digital wallet, or both, a backup of the digital wallet may be stored on a content addressable storage (CAS) system, one example being the Interplanetary File System (IPFS). Using a distributed storage system allows for higher resilience but centralized storage systems, such as the datastore 138 may be employed.

In some embodiments, the encryption of the digital wallet may employ a wallet encryption key 609. In some embodiments, the wallet encryption key 609 may be is further encrypted with a user encryption key 608 (e.g., a password, personal identification number, or other secret key) and a recovery key 607.

In some embodiments, the recovery key may be based on answers to user provided questions. In some embodiments, the answers are tokenized, and a hash is produced for each to generate a secret answer 1 hash 601, a secret answer 2 hash 602, a secret answer 3 hash 603, a secret answer 4 hash 604, a secret answer 5 hash 605 or any suitable number of answers. In some embodiments, any suitable hashing algorithm for secrets may be employed, such as any hashing algorithm that accounts for incorrect case, punctuation, extra spacing, diacritics, but not incorrect word ordering. The system stores the questions the user provided and can optionally guide or check questions to help ensure security.

In some embodiments, the recovery key 607 may be generated based on Shamir's Secret Sharing (SSS) to establish a quorum (for example, the user needs only to provide 3 answers out of 5 to obtain the recovery key, 4 answers out of 7, 5 answers out of 8, or other suitable number of answers).

Thus, the create the recovery key 607 to recover the backup of the digital wallet or access the digital wallet, the user may provide the user encryption key 608 or N out of M secret answers to unlock their wallet.

Figure 7:
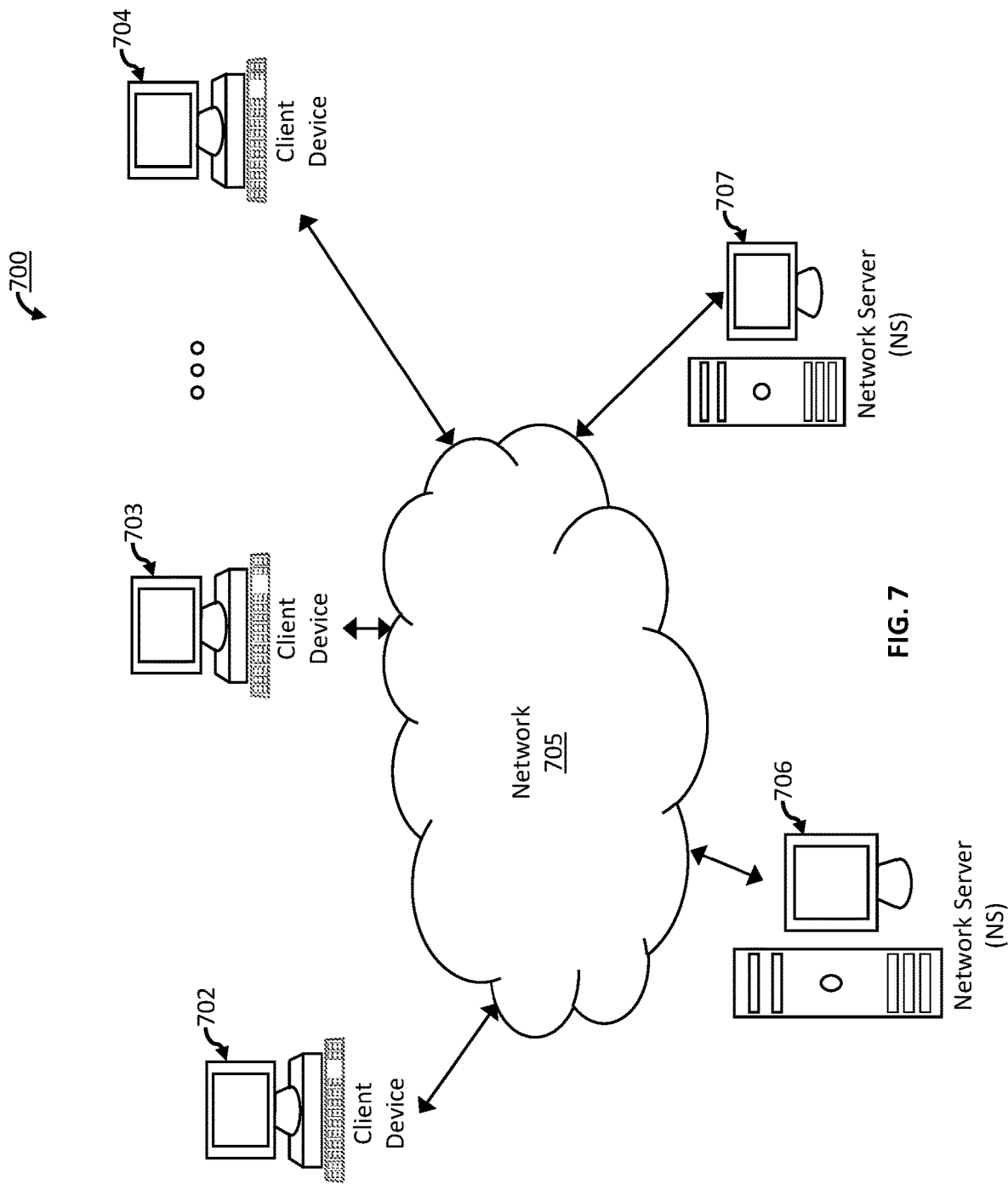
FIG. 7 depicts a block diagram of an exemplary computer-based system and platform 700 for dynamic code validation of electronic operations in accordance with one or more embodiments of the present disclosure.

FIG. 7 depicts a block diagram of an exemplary computer-based system and platform 700 for dynamic code validation of electronic operations in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 700 may be configured to manage a large number of members and concurrent transactions, as detailed herein. In some embodiments, the exemplary computer-based system and platform 700 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 7, member computing device 702, member computing device 703 through member computing device 704 (e.g., clients) of the exemplary computer-based system and platform 700 may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, GB-s citizens band radio, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), a point-of-sale (POS) device, and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 702-704 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 705 may also include mass storage, such as network attached storage (NAS), a storage area network (SAN), a content delivery network (CDN) or other forms of computer or machine-readable media.

In some embodiments, the exemplary server 706 or the exemplary server 707 may be a web server (or a series of servers) running a network operating system, examples of which may include but are not limited to Apache on Linux or Microsoft IIS (Internet Information Services). In some embodiments, the exemplary server 706 or the exemplary server 707 may be used for and/or provide cloud and/or network computing. Although not shown in FIG. 7, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 8:
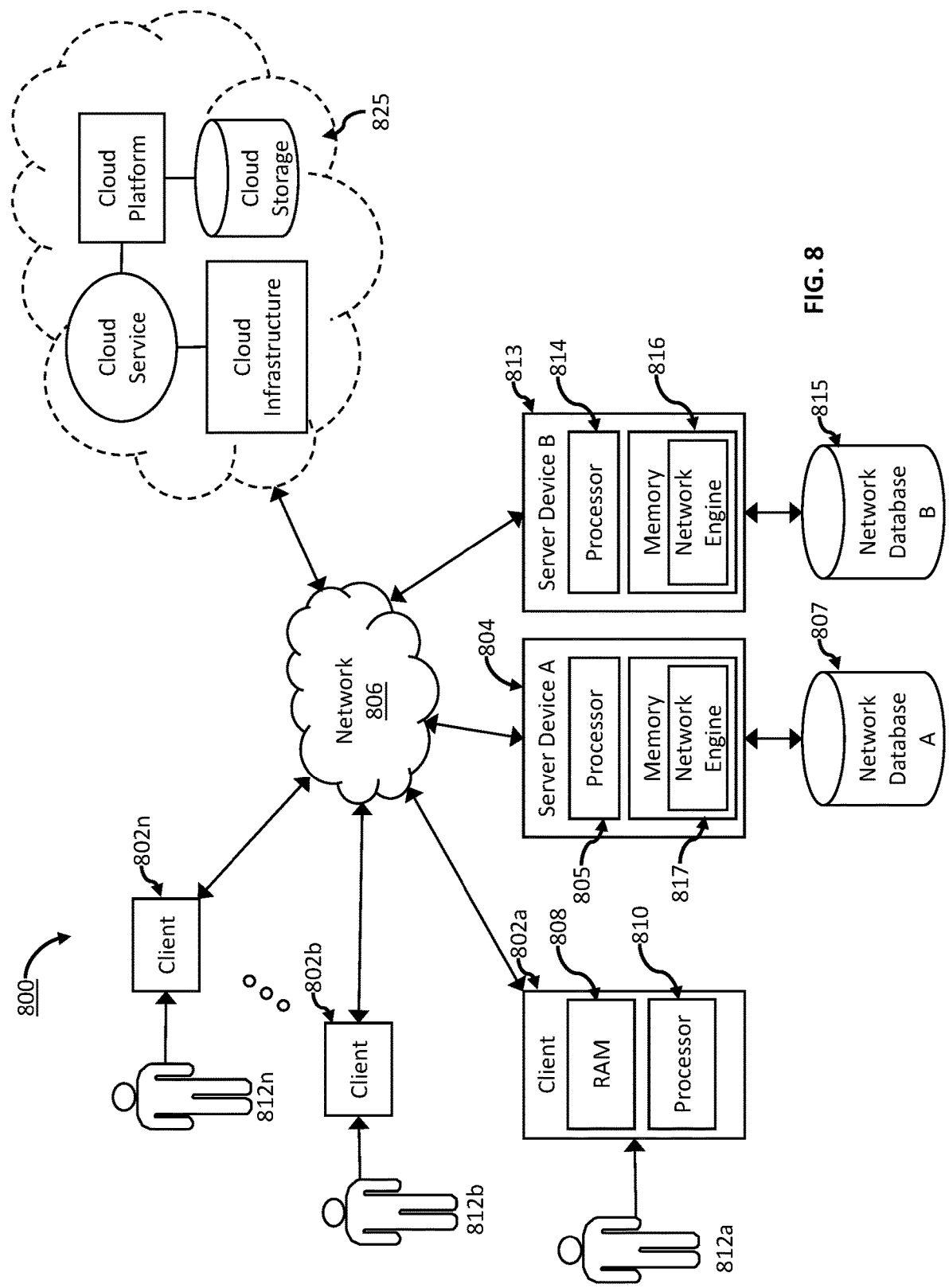
FIG. 8 depicts a block diagram of another exemplary computer-based system and platform 800 for dynamic code validation of electronic operations in accordance with one or more embodiments of the present disclosure.

FIG. 8 depicts a block diagram of another exemplary computer-based system and platform 800 for dynamic code validation of electronic operations in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 802a, member computing device 802b through member computing device 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, user 812a, user 812b through user 812n, may communicate over the exemplary network 806 with each other and/or with other systems and/or devices coupled to the network 806. As shown in FIG. 8, exemplary server devices 804 and 813 may include processor 805 and processor 814, respectively, as well as memory 817 and memory 816, respectively. In some embodiments, the server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
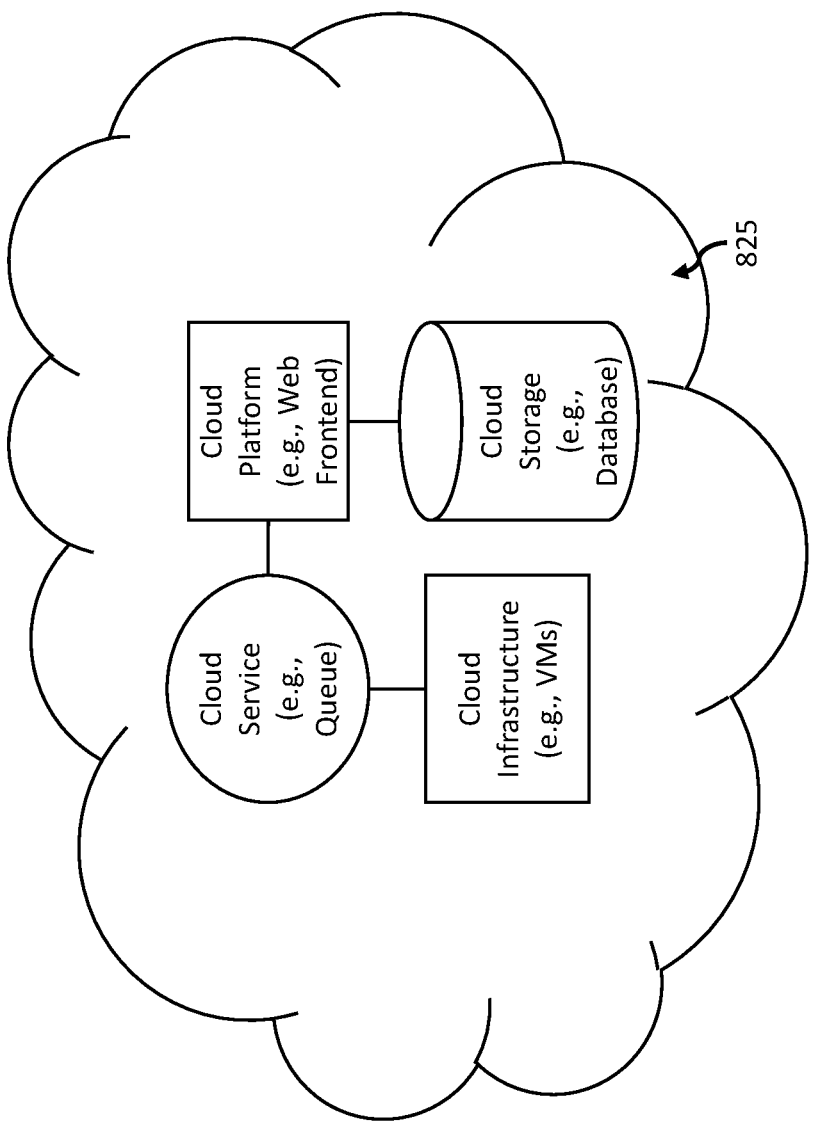
FIG. 9 illustrates schematics of exemplary implementations of the cloud computing/architecture(s) for the dynamic code validation protocol of the present disclosure may be specifically configured to operate.
Figure 10:
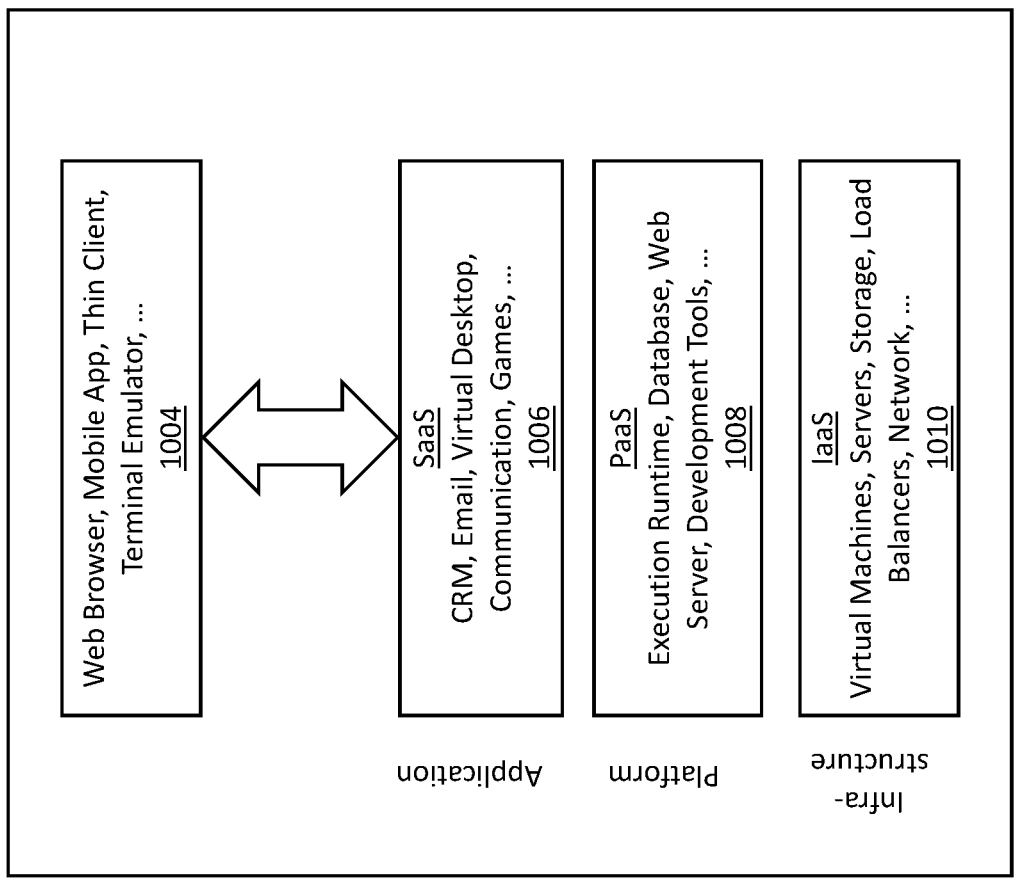
FIG. 10 illustrates schematics of exemplary implementations of the cloud computing/architecture(s) for the dynamic code validation protocol of the present disclosure may be specifically configured to operate.

In some embodiments, the exemplary inventive computer-based systems/platforms, the exemplary inventive computer-based devices, and/or the exemplary inventive computer-based components of the present disclosure may be specifically configured to operate in a cloud computing/architecture 825 such as, but not limiting to: infrastructure as a service (IaaS) 1010, platform as a service (PaaS) 1008, and/or software as a service (SaaS) 1006 using a web browser, mobile app, thin client, terminal emulator or other endpoint 1004. FIGS. 9 and 10 illustrate schematics of exemplary implementations of the cloud computing/architecture(s) for the dynamic code validation protocol of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming, customer service interactions via SMS, chat, or AI bot, and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative, and not restrictive.

At least some aspects of the present disclosure will now be described with reference to the following numbered clauses.

1. A method comprising:
   receiving, by at least one processor from an access control server, an operation authorization request to authorize an operation by at least one initiator;
      wherein the operation authorization request comprises:
         a user identifier that identifies a user associated with the operation authorization request, and
         at least one dynamic code;
   accessing, by the at least one processor, at least one dynamic key embedded in a user credential associated with the user identifier;
   generating, by the at least one processor, at least one recalculated dynamic code using at least one cryptographic algorithm based at least in part on the at least one dynamic key;
   authenticating, by the at least one processor, the operation authorization request based at least in part on the at least one dynamic code being the at least one recalculated dynamic code; and
   instructing, by the at least one processor, the access control server to authorize the operation associated with the operation authorization request.

13. A system comprising:
   at least one processor configured to execute software instruction in a non-transitory computer readable medium, wherein upon execution of the software instructions, the at least one processor is configured to perform steps to:
      receive, from an access control server, an operation authorization request to authorize an operation by at least one initiator;
         wherein the operation authorization request comprises:
            a user identifier that identifies a user associated with the operation authorization request, and
            at least one dynamic code;
      access at least one dynamic key embedded in a user credential associated with the user identifier;
      generate at least one recalculated dynamic code using at least one cryptographic algorithm based at least in part on the at least one dynamic key;
      authenticate the operation authorization request based at least in part on the at least one dynamic code being the at least one recalculated dynamic code; and
      instruct the access control server to authorize an operation associated with the operation authorization request.

3. The system and/or method as recited in any of clauses 1 and/or 2, further comprising:
   receiving, by the at least one processor from a user device, at least one recurring dynamic code request that requests at least one cloud agent to produce at least one subsequent dynamic code for at least one subsequent recurring operation authorization request of a plurality of recurring operation authorization requests;
      wherein the plurality of recurring operation authorization requests comprises:
         the operation authorization request and
         the at least one subsequent recurring operation authorization request;
   determining, by the at least one processor, the user credential associated with the user device;
   accessing, by the at least one processor, the at least one dynamic key embedded in the user credential
   generating, by the at least one processor, the at least one subsequent dynamic code using the at least one cryptographic algorithm based at least in part on the at least one dynamic key;
   returning, by the at least one processor, at least one initiation instruction to the at least one cloud agent;
      wherein the at least one initiation instruction causes the at least one cloud agent to request at least one initiator to produce at least one subsequent recurring operation authorization request to authorize at least one subsequent recurring operation; and
      wherein the at least one initiation instruction comprises the at least one subsequent dynamic code.

4. The system and/or method as recited in any of clauses 1, 2 and/or 3, further comprising:
   determining, by the at least one processor, at least one policy associated with the user device;
      wherein the at least one policy comprises at least one of:
         a quantity restriction,
         a time restriction, or
         a geographic restriction;
   determining, by the at least one processor, at least one attribute of the at least one subsequent recurring operation authorization request;
      wherein the at least one attribute comprise at least one of:
         a quantity attribute indicating a requested quantity,
         a time attribute indicating a time of the at least one subsequent recurring operation authorization request, or
         a geographic location attribute indicating a geographic location of the at least one subsequent recurring operation authorization request; and
   returning, by the at least one processor, the at least one initiation instruction to the at least one cloud agent based on the at least one attribute being within the at least one policy.

5. The system and/or method as recited in any of clauses 1 and/or 2, further comprising:
   receiving, by the at least one processor from a user device, at least one dynamic code request that requests the access control server to generate the at least one dynamic code for the operation authorization request;
   determining, by the at least one processor, the user credential associated with the user device;
   accessing, by the at least one processor, the at least one dynamic key embedded in the user credential;
   generating, by the at least one processor, the at least one dynamic code using the at least one cryptographic algorithm based at least in part on the at least one dynamic key; and
   returning, by the at least one processor, the at least one dynamic code to the user device.

6. The system and/or method as recited in any of clauses 1 and/or 2, further comprising:

receiving, by the at least one processor from a user device, at least one dynamic code request;

determining, by the at least one processor, the user credential associated with the user device;

accessing, by the at least one processor, the at least one dynamic key embedded in the user credential; and returning, by the at least one processor, the at least one dynamic key and at least one code generation instruction to the user device;

wherein the at least one code generation instruction causes the user device to generate the at least one dynamic code using at least one cryptographic algorithm based at least in part on the at least one dynamic key.

7. The system and/or method as recited in any of clauses 1, 2 and/or 6, wherein the at least one code generation instruction causes the user device to autofill the at least one dynamic code into at least one Card Verification Value (CVV) field of at least one online purchase webpage to create the operation authorization request.

8. The system and/or method as recited in any of clauses 1 and/or 2, wherein the at least one dynamic code comprises a Hash-based Message Authentication Code (HMAC).

9. The system and/or method as recited in any of clauses 1 and/or 2, further comprising:

determining, by the at least one processor, a current time;

utilizing, by the at least one processor, the cryptographic algorithm to generate at least one hash based at least in part on the current time and the at least one dynamic key; and truncating, by the at least one processor, the at least one hash to a predetermined length to produce the at least one recalculated dynamic code.

10. The system and/or method as recited in any of clauses 1, 2 and/or 9, further comprising:

determining, by the at least one processor, that the at least one recalculated dynamic code is different from the at least one dynamic code;

determining, by the at least one processor, a previous time that precedes the current time by a predetermined interval;

utilizing, by the at least one processor, the cryptographic algorithm to generate at least one hash based at least in part on the current time and the at least one dynamic key; and truncating, by the at least one processor, the at least one hash to a predetermined length to produce the at least one recalculated dynamic code.

11. The system and/or method as recited in any of clauses 1 and/or 2, wherein the cryptographic algorithm comprises a Format-Preserving Encryption (FPE).

12. The system and/or method as recited in any of clauses 1 and/or 2, further comprising:

receiving, by the at least one processor, the at least one dynamic key from a user device;

wherein the user device is associated with the user identifier; and embedding, by the at least one processor, the at least one dynamic key in the user credential associated with the user identifier.

13. The system and/or method as recited in any of clauses 1 and/or 2, wherein the user credential is stored in a database comprising at least one of a centralized database or a decentralized database.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:

receiving, by at least one processor from an access control server, an operation authorization request to authorize an operation by at least one initiator;

wherein the operation authorization request comprises:

a user identifier that identifies a user associated with the operation authorization request, and at least one dynamic code;

accessing, by the at least one processor, at least one dynamic key embedded in a user credential associated with the user identifier;

generating, by the at least one processor, at least one recalculated dynamic code using at least one cryptographic algorithm based at least in part on the at least one dynamic key;

authenticating, by the at least one processor, the operation authorization request based at least in part on the at least one dynamic code being the at least one recalculated dynamic code; and instructing, by the at least one processor, the access control server to authorize the operation associated with the operation authorization request.

2. The method as recited in claim 1, further comprising:

receiving, by the at least one processor from a user device, at least one recurring dynamic code request that requests at least one cloud agent to produce at least one subsequent dynamic code for at least one subsequent recurring operation authorization request of a plurality of recurring operation authorization requests;

wherein the plurality of recurring operation authorization requests comprises:

the operation authorization request and the at least one subsequent recurring operation authorization request;

determining, by the at least one processor, the user credential associated with the user device;

accessing, by the at least one processor, the at least one dynamic key embedded in the user credential;

generating, by the at least one processor, the at least one subsequent dynamic code using the at least one cryptographic algorithm based at least in part on the at least one dynamic key;

returning, by the at least one processor, at least one initiation instruction to the at least one cloud agent;

wherein the at least one initiation instruction causes the at least one cloud agent to request at least one initiator to produce at least one subsequent recurring operation authorization request to authorize at least one subsequent recurring operation; and wherein the at least one initiation instruction comprises the at least one subsequent dynamic code.

3. The method as recited in claim 2, further comprising:
determining, by the at least one processor, at least one policy associated with the user device;
 wherein the at least one policy comprises at least one of:
  a quantity restriction,
  a time restriction, or
  a geographic restriction;
determining, by the at least one processor, at least one attribute of the at least one subsequent recurring operation authorization request;
 wherein the at least one attribute comprise at least one of:
  a quantity attribute indicating a requested quantity,
  a time attribute indicating a time of the at least one subsequent recurring operation authorization request, or
  a geographic location attribute indicating a geographic location of the at least one subsequent recurring operation authorization request; and
returning, by the at least one processor, the at least one initiation instruction to the at least one cloud agent based on the at least one attribute being within the at least one policy.

4. The method as recited in claim 1, further comprising:
receiving, by the at least one processor from a user device, at least one dynamic code request that requests the access control server to generate the at least one dynamic code for the operation authorization request;
determining, by the at least one processor, the user credential associated with the user device;
accessing, by the at least one processor, the at least one dynamic key embedded in the user credential;
generating, by the at least one processor, the at least one dynamic code using the at least one cryptographic algorithm based at least in part on the at least one dynamic key; and
returning, by the at least one processor, the at least one dynamic code to the user device.

5. The method as recited in claim 1, further comprising:
receiving, by the at least one processor from a user device, at least one dynamic code request;
determining, by the at least one processor, the user credential associated with the user device;
accessing, by the at least one processor, the at least one dynamic key embedded in the user credential; and
returning, by the at least one processor, the at least one dynamic key and at least one code generation instruction to the user device;
 wherein the at least one code generation instruction causes the user device to generate the at least one dynamic code using at least one cryptographic algorithm based at least in part on the at least one dynamic key.

6. The method as recited in claim 5, wherein the at least one code generation instruction causes the user device to autofill the at least one dynamic code into at least one Card Verification Value (CVV) field of at least one online purchase webpage to create the operation authorization request.

7. The method as recited in claim 1, wherein the at least one dynamic code comprises a Hash-based Message Authentication Code (HMAC).

8. The method as recited in claim 1, further comprising:
determining, by the at least one processor, a current time;
utilizing, by the at least one processor, the cryptographic algorithm to generate at least one hash based at least in part on the current time and the at least one dynamic key; and
truncating, by the at least one processor, the at least one hash to a predetermined length to produce the at least one recalculated dynamic code.

9. The method as recited in claim 8, further comprising:
determining, by the at least one processor, that the at least one recalculated dynamic code is different from the at least one dynamic code;
determining, by the at least one processor, a previous time that precedes the current time by a predetermined interval;
utilizing, by the at least one processor, the cryptographic algorithm to generate at least one hash based at least in part on the current time and the at least one dynamic key; and
truncating, by the at least one processor, the at least one hash to a predetermined length to produce the at least one recalculated dynamic code.

10. The method as recited in claim 1, wherein the cryptographic algorithm comprises a Format-Preserving Encryption (FPE).

11. The method as recited in claim 1, further comprising:
receiving, by the at least one processor, the at least one dynamic key from a user device;
 wherein the user device is associated with the user identifier; and
embedding, by the at least one processor, the at least one dynamic key in the user credential associated with the user identifier.

12. The method as recited in claim 1, wherein the user credential is stored in a database comprising at least one of a centralized database or a decentralized database.

13. A system comprising:
at least one processor configured to execute software instruction in a non-transitory computer readable medium, wherein upon execution of the software instructions, the at least one processor is configured to perform steps to:
 receive, from an access control server, an operation authorization request to authorize an operation by at least one initiator;
  wherein the operation authorization request comprises:
   a user identifier that identifies a user associated with the operation authorization request, and
   at least one dynamic code;
 access at least one dynamic key embedded in a user credential associated with the user identifier;
 generate at least one recalculated dynamic code using at least one cryptographic algorithm based at least in part on the at least one dynamic key;
 authenticate the operation authorization request based at least in part on the at least one dynamic code being the at least one recalculated dynamic code; and
 instruct the access control server to authorize an operation associated with the operation authorization request.

14. The system as recited in claim 13, wherein upon execution of the software instructions, the at least one processor is further configured to perform steps to:
receive, from a user device, at least one recurring dynamic code request that requests at least one cloud agent to produce at least one subsequent dynamic code for at least one subsequent recurring operation authorization request of a plurality of recurring operation authorization requests;
  wherein the plurality of recurring operation authorization requests comprises:
    the operation authorization request and
    the at least one subsequent recurring operation authorization request;
determine the user credential associated with the user device;
access the at least one dynamic key embedded in the user credential;
generate the at least one subsequent dynamic code using the at least one cryptographic algorithm based at least in part on the at least one dynamic key;
return at least one initiation instruction to the at least one cloud agent;
  wherein the at least one initiation instruction causes the at least one cloud agent to request at least one initiator to produce at least one subsequent recurring operation authorization request to authorize at least one subsequent recurring operation; and
  wherein the at least one initiation instruction comprises the at least one subsequent dynamic code.

15. The system as recited in claim 14, wherein upon execution of the software instructions, the at least one processor is further configured to perform steps to:
  determine at least one policy associated with the user device;
    wherein the at least one policy comprises at least one of:
      a quantity restriction,
      a time restriction, or
      a geographic restriction;
  determine at least one attribute of the at least one subsequent recurring operation authorization request;
    wherein the at least one attribute comprise at least one of:
      a quantity attribute indicating a requested quantity,
      a time attribute indicating a time of the at least one subsequent recurring operation authorization request, or
      a geographic location attribute indicating a geographic location of the at least one subsequent recurring operation authorization request; and
  return the at least one initiation instruction to the at least one cloud agent based on the at least one attribute being within the at least one policy.

16. The system as recited in claim 13, wherein upon execution of the software instructions, the at least one processor is further configured to perform steps to:
  receive, from a user device, at least one dynamic code request that requests the access control server to generate the at least one dynamic code for the operation authorization request;
  determine the user credential associated with the user device;
  access the at least one dynamic key embedded in the user credential;
  generate the at least one dynamic code using the at least one cryptographic algorithm based at least in part on the at least one dynamic key; and
  return the at least one dynamic code to the user device.

17. The system as recited in claim 13, wherein upon execution of the software instructions, the at least one processor is further configured to perform steps to:
  receive, from a user device, at least one dynamic code request;
  determine the user credential associated with the user device;
  access the at least one dynamic key embedded in the user credential; and
  return the at least one dynamic key and at least one code generation instruction to the user device;
    wherein the at least one code generation instruction causes the user device to generate the at least one dynamic code using at least one cryptographic algorithm based at least in part on the at least one dynamic key.

18. The system as recited in claim 17, wherein the at least one code generation instruction causes the user device to autofill the at least one dynamic code into at least one Card Verification Value (CVV) field of at least one online purchase webpage to create the operation authorization request.

19. The system as recited in claim 13, wherein upon execution of the software instructions, the at least one processor is further configured to perform steps to:
  determine a current time;
  utilize the cryptographic algorithm to generate at least one hash based at least in part on the current time and the at least one dynamic key; and
  truncate the at least one hash to a predetermined length to produce the at least one recalculated dynamic code.

20. The system as recited in claim 19, wherein upon execution of the software instructions, the at least one processor is further configured to perform steps to:
  determine that the at least one recalculated dynamic code is different from the at least one dynamic code;
  determine a previous time that precedes the current time by a predetermined interval;
  utilize the cryptographic algorithm to generate at least one hash based at least in part on the current time and the at least one dynamic key; and
  truncate the at least one hash to a predetermined length to produce the at least one recalculated dynamic code.

* * * * *